June 12, 1951 E. S. HINELINE 2,556,967
HAND-HELD ROLL-FILM CAMERA WITH INTERLOCKING
FOCAL-PLANE SHUTTER CURTAINS
Filed Aug. 10, 1946 16 Sheets-Sheet 1
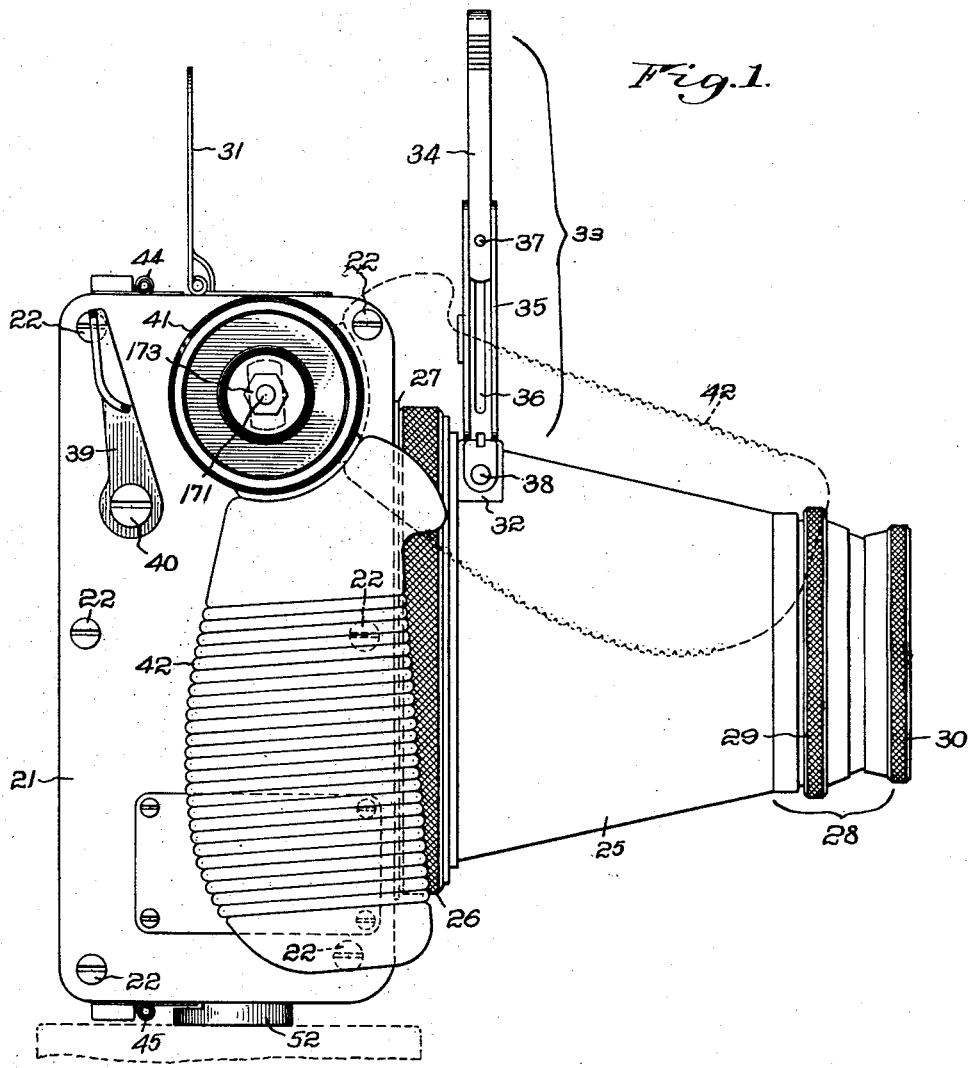
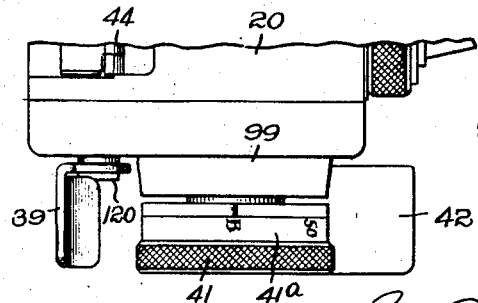
INVENTOR.
Edson S. Hineline
BY
his Attorneys June 12, 1951  E. S. HINELINE  2,556,967
HAND-HELD ROLL-FILM CAMERA WITH INTERLOCKING
FOCAL-PLANE SHUTTER CURTAINS
Filed Aug. 10, 1946  16 Sheets-Sheet 2

INVENTOR.
Edson S. Hineline
his Attorneys

June 12, 1951 E. S. HINELINE 2,556,967
HAND-HELD ROLL-FILM CAMERA WITH INTERLOCKING
FOCAL-PLANE SHUTTER CURTAINS
Filed Aug. 10, 1946 16 Sheets-Sheet 3
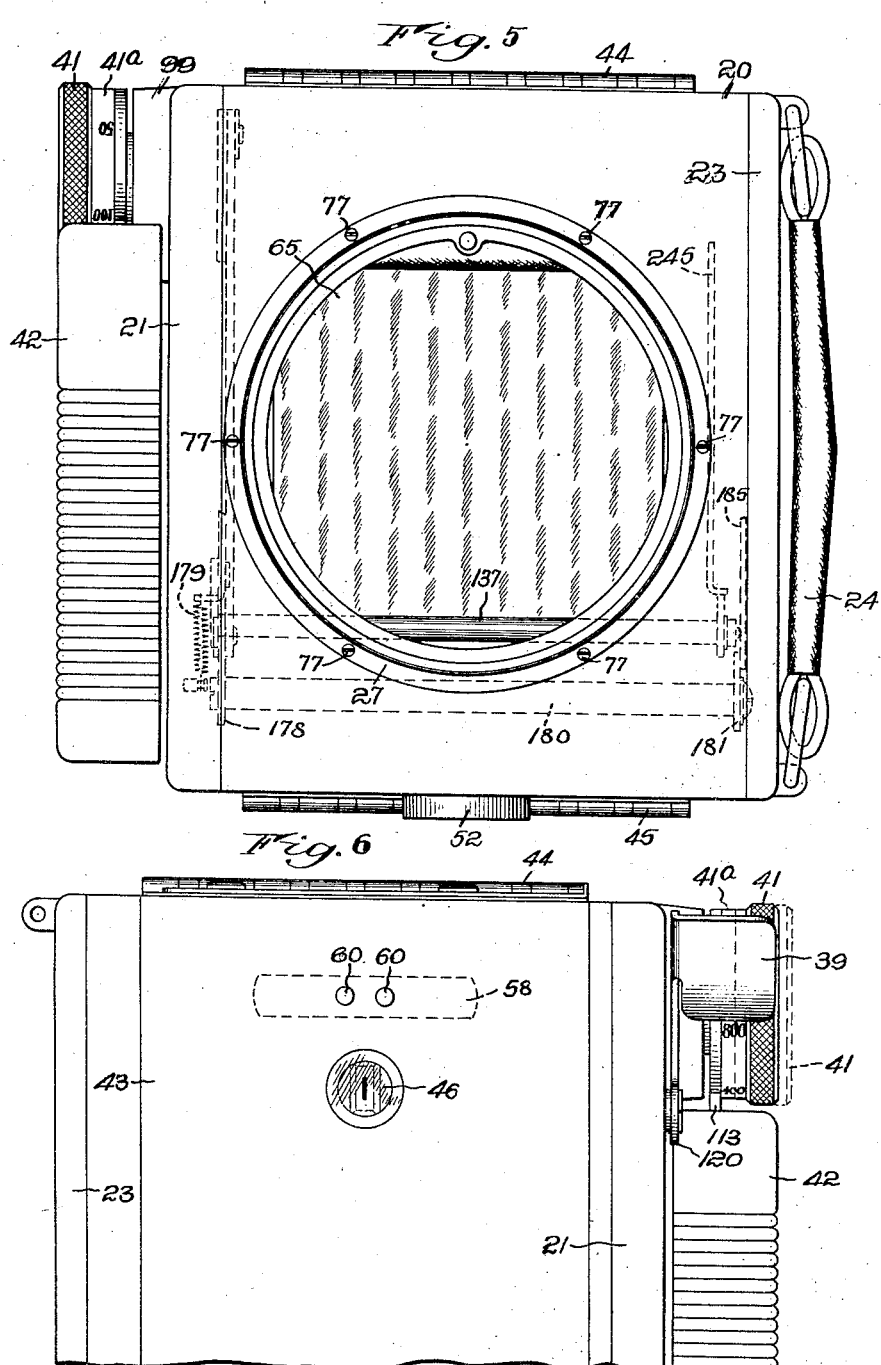
INVENTOR.
Edson S. Hineline
BY
his Attorneys

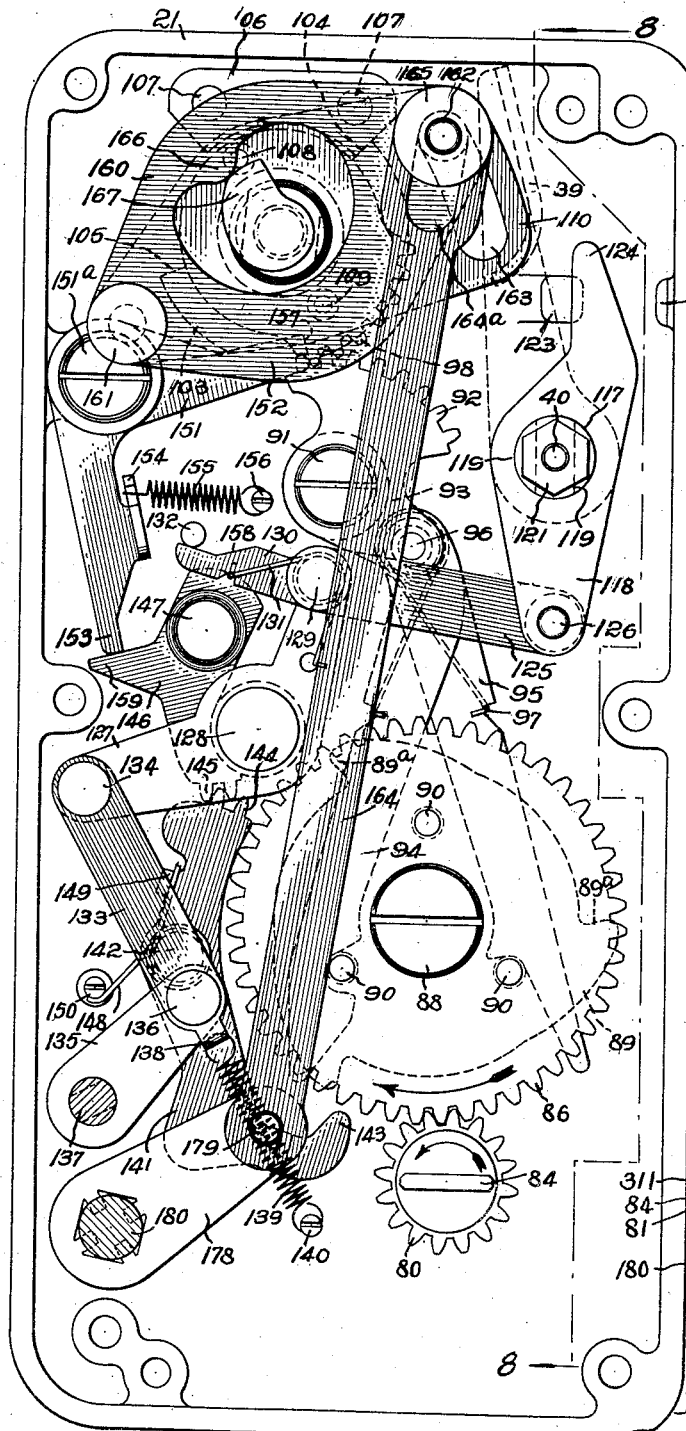

June 12, 1951
E. S. HINELINE
2,556,967
HAND-HELD ROLL-FILM CAMERA WITH INTERLOCKING
FOCAL-PLANE SHUTTER CURTAINS
Filed Aug. 10, 1946
16 Sheets-Sheet 5
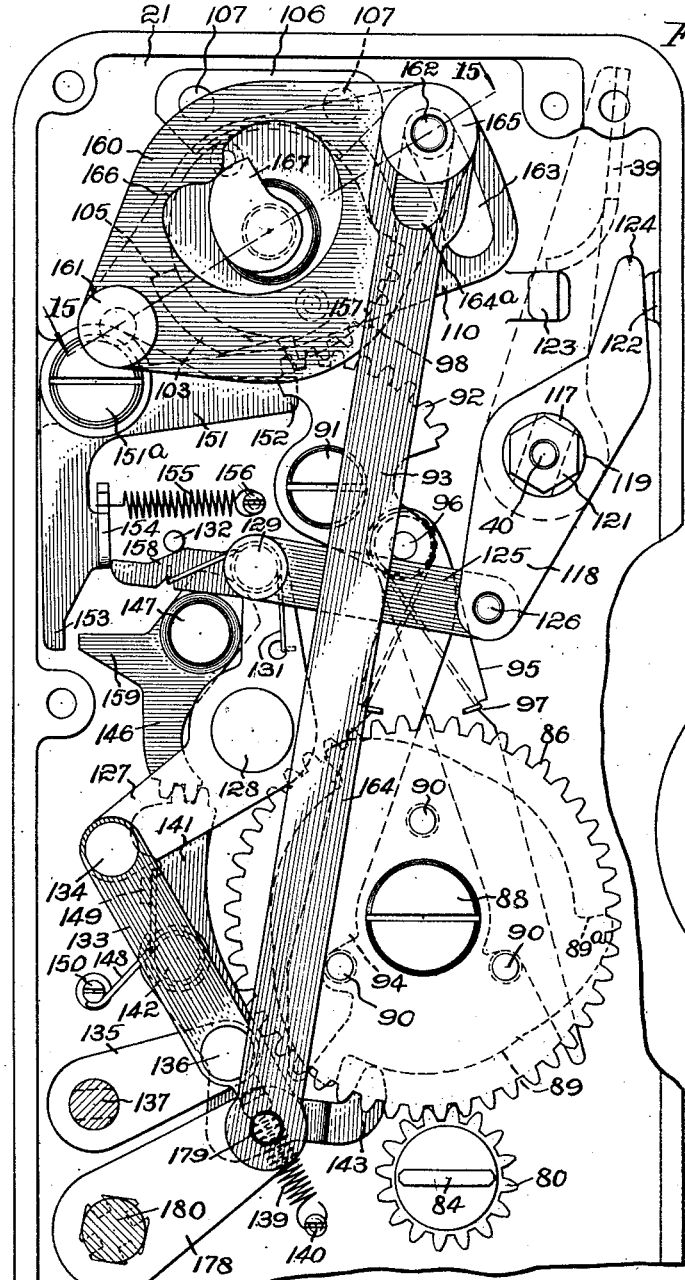
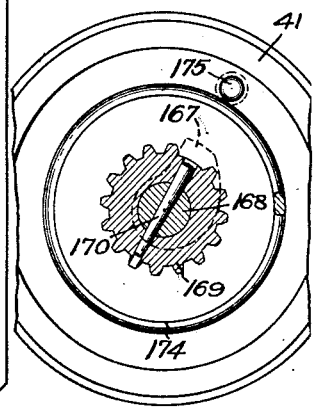
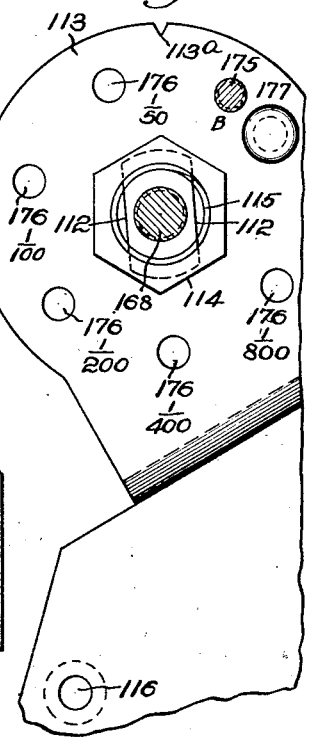
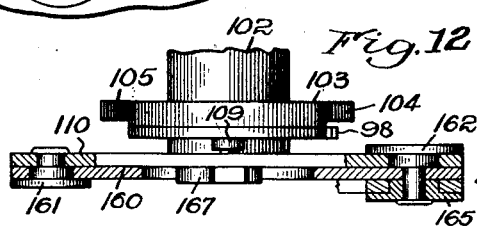
INVENTOR.
Edson S. Hineline
BY
his Attorneys

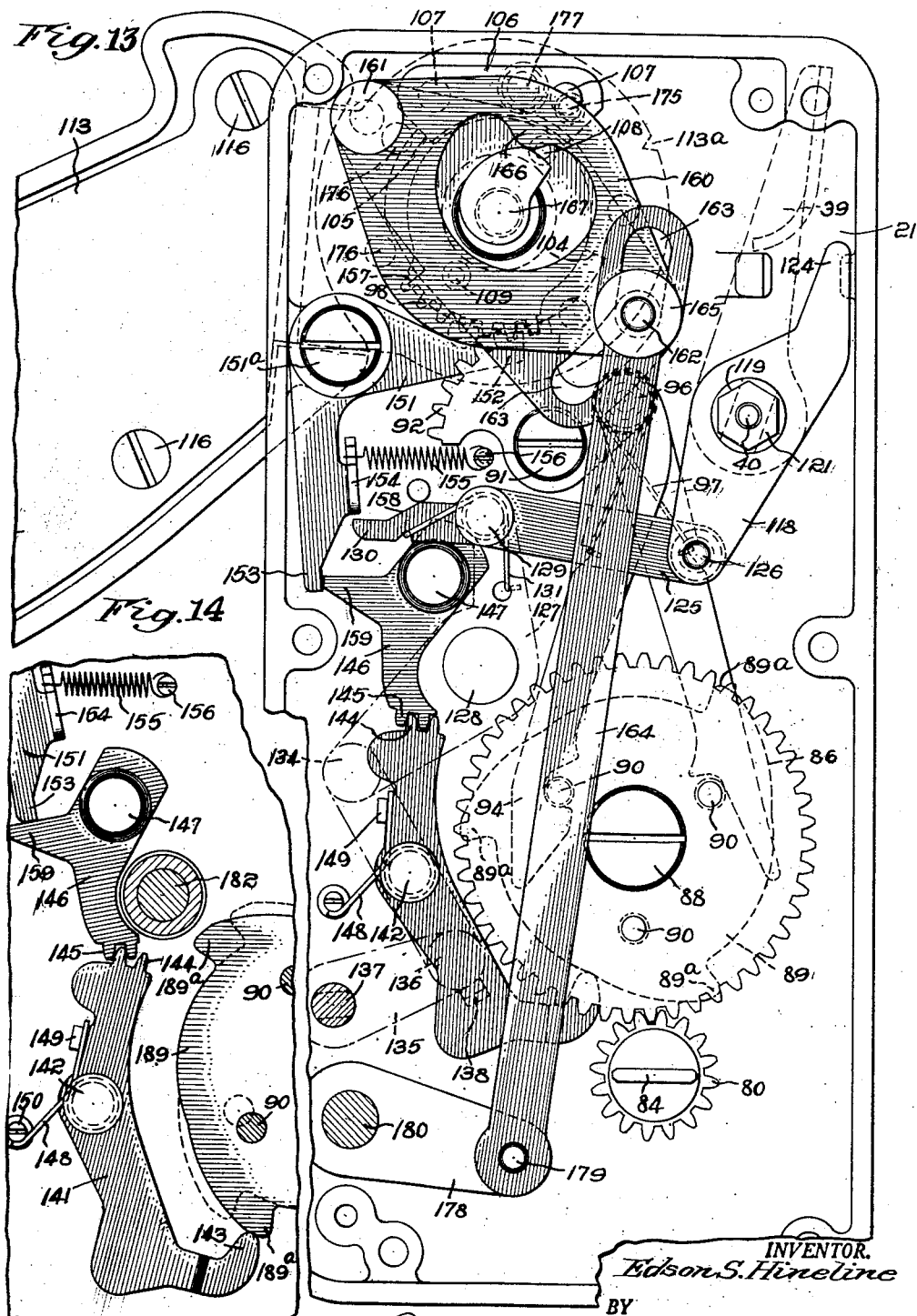

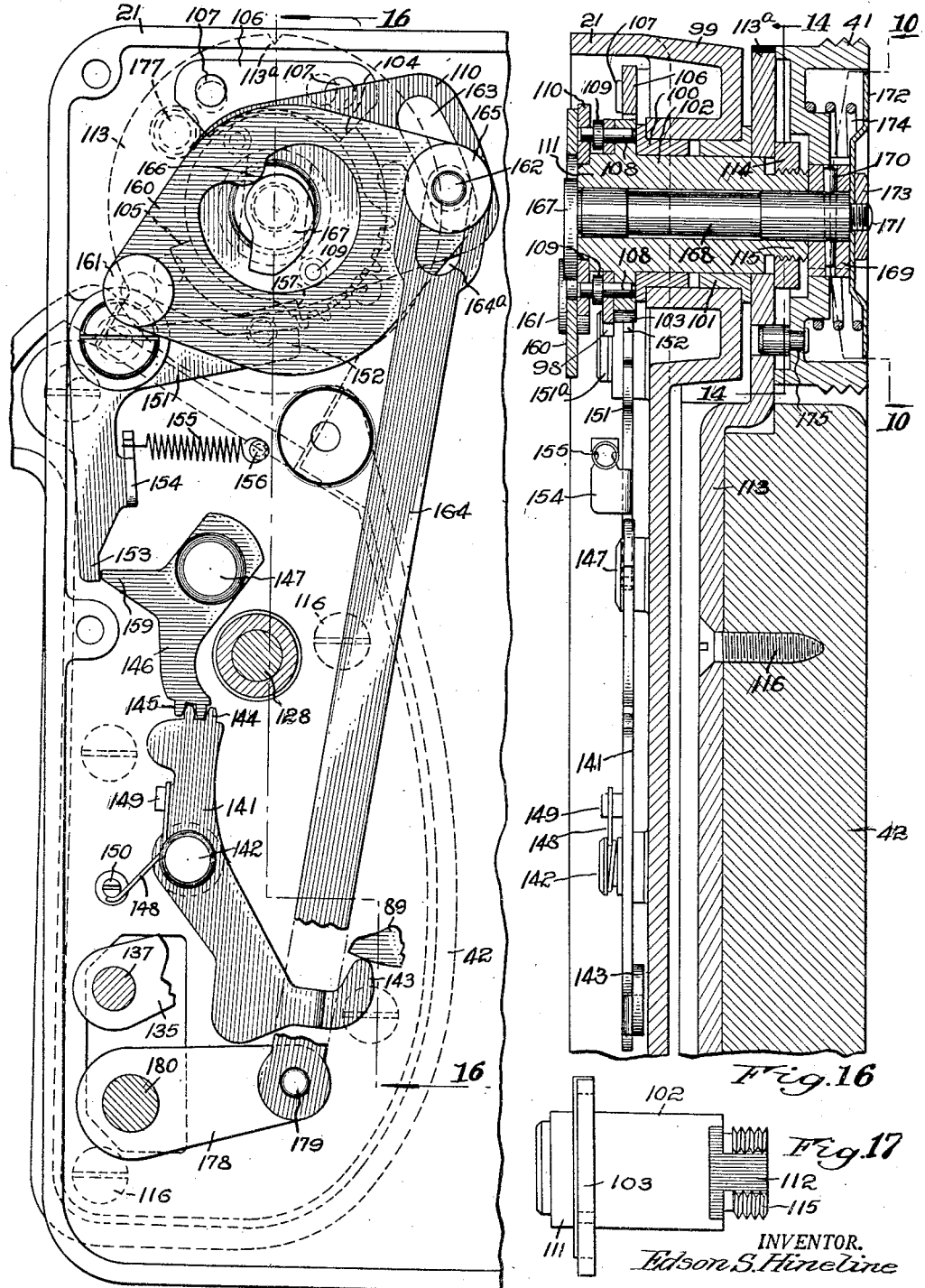

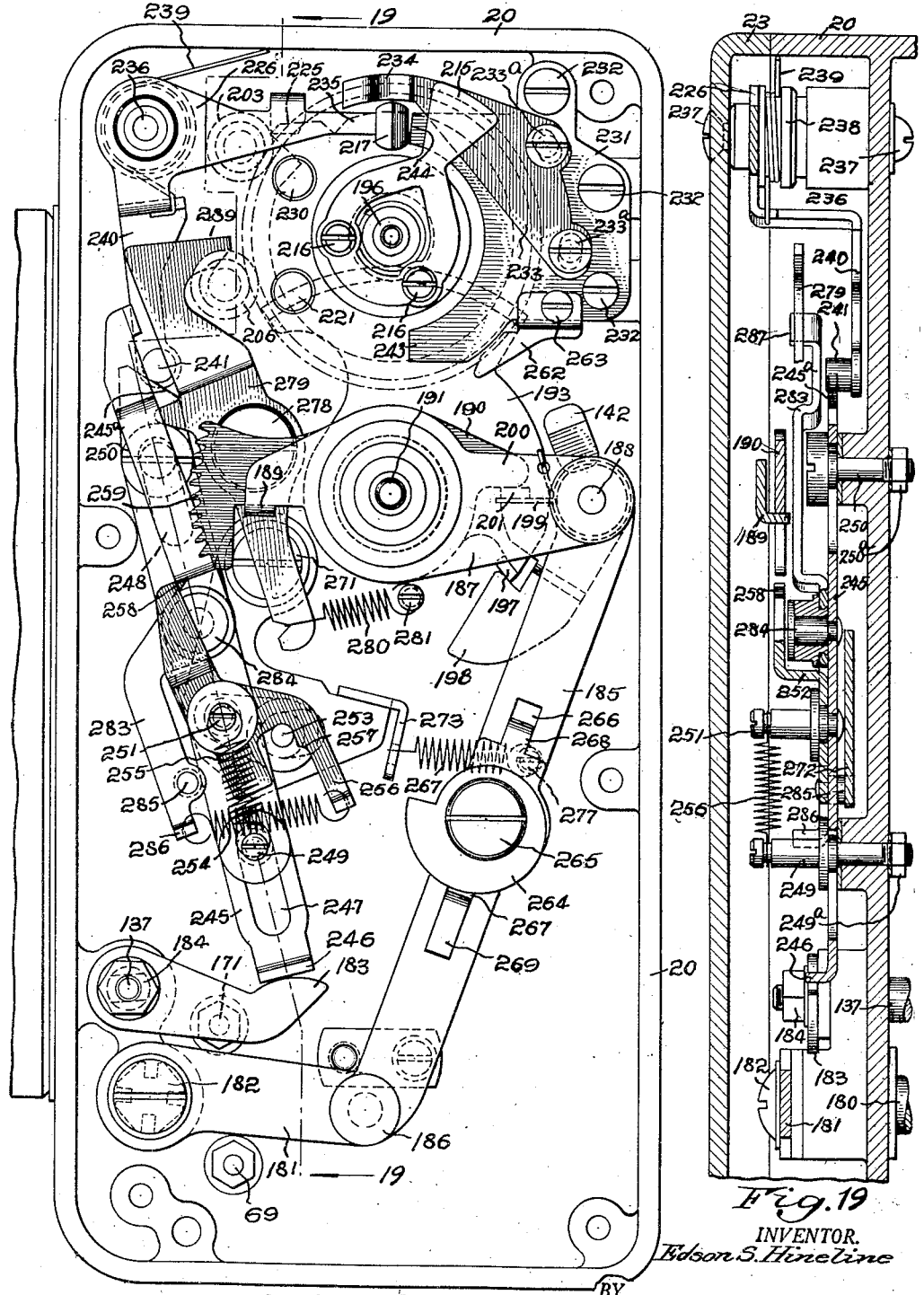

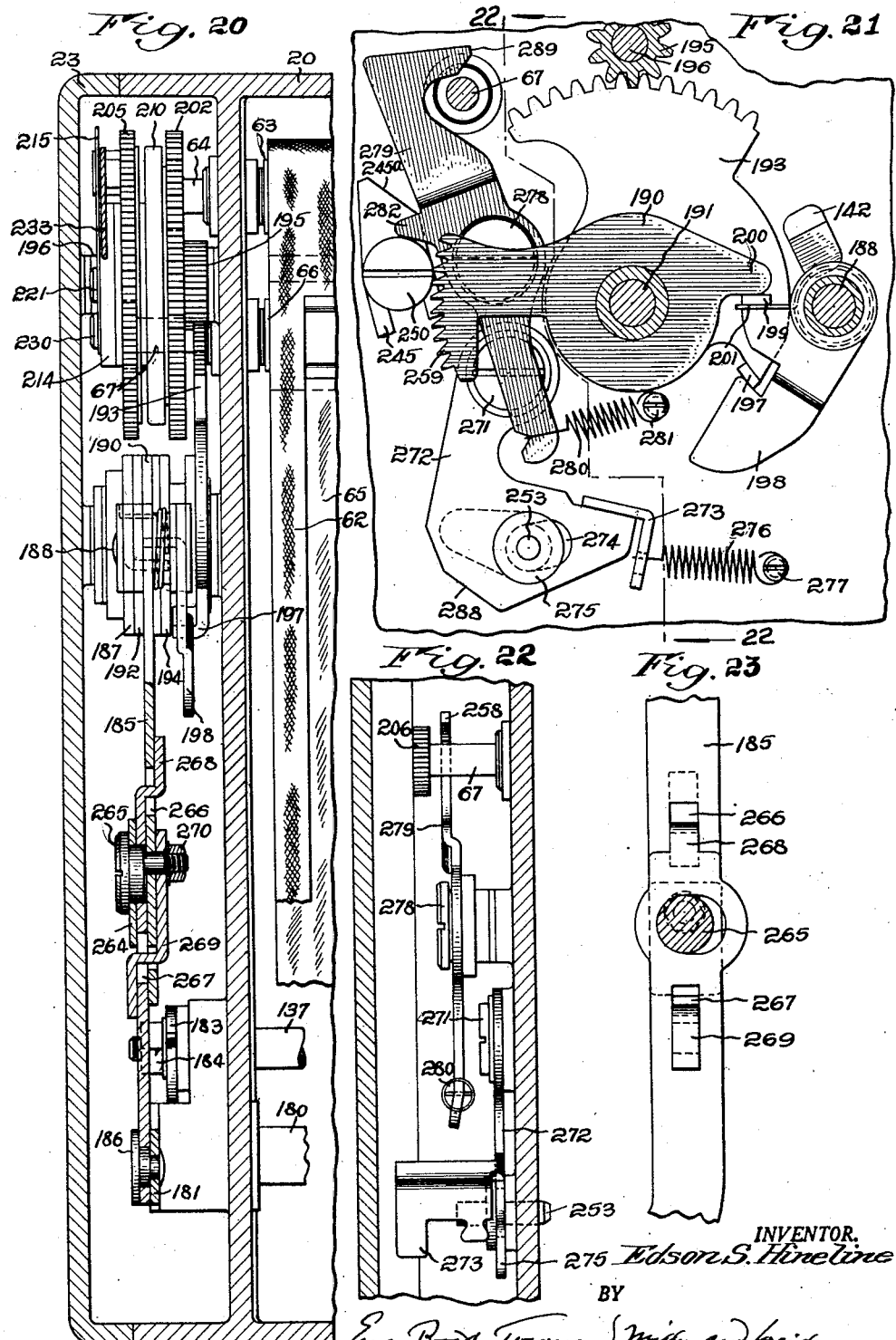

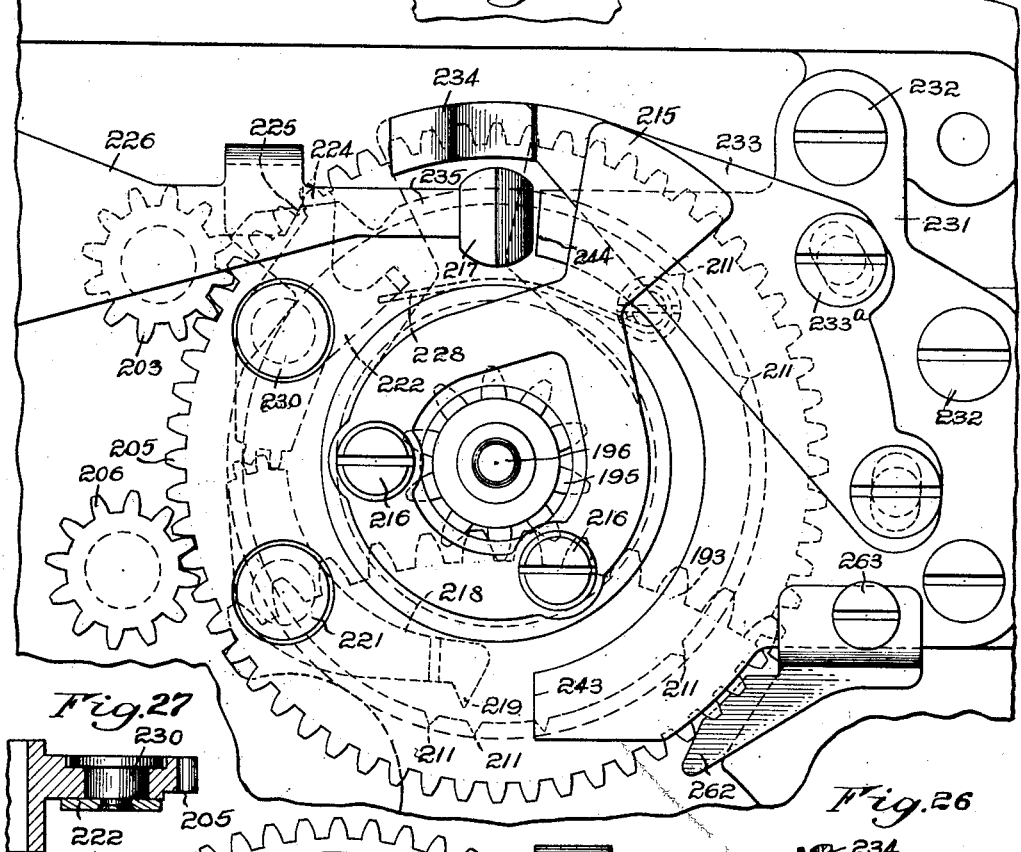
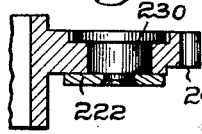
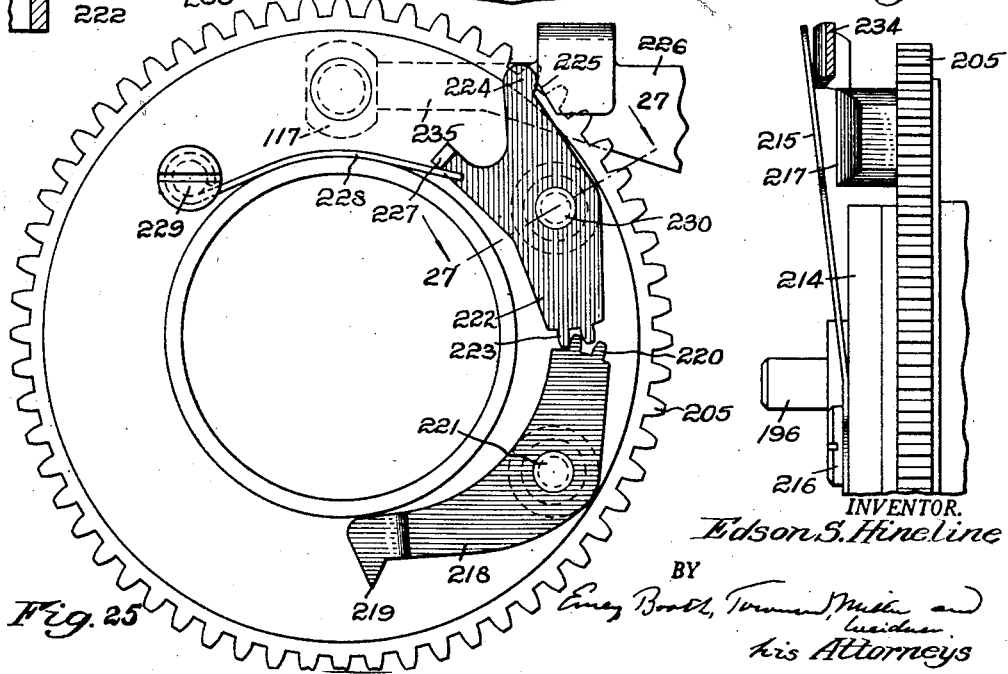

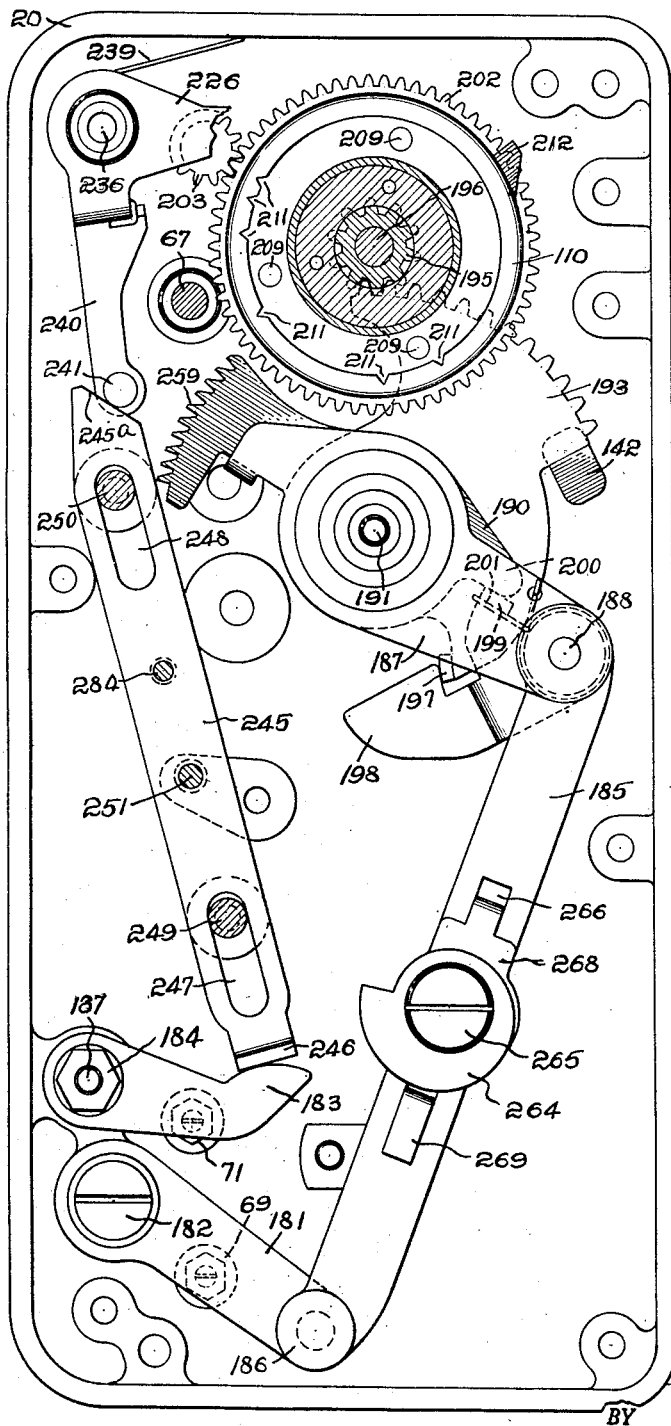

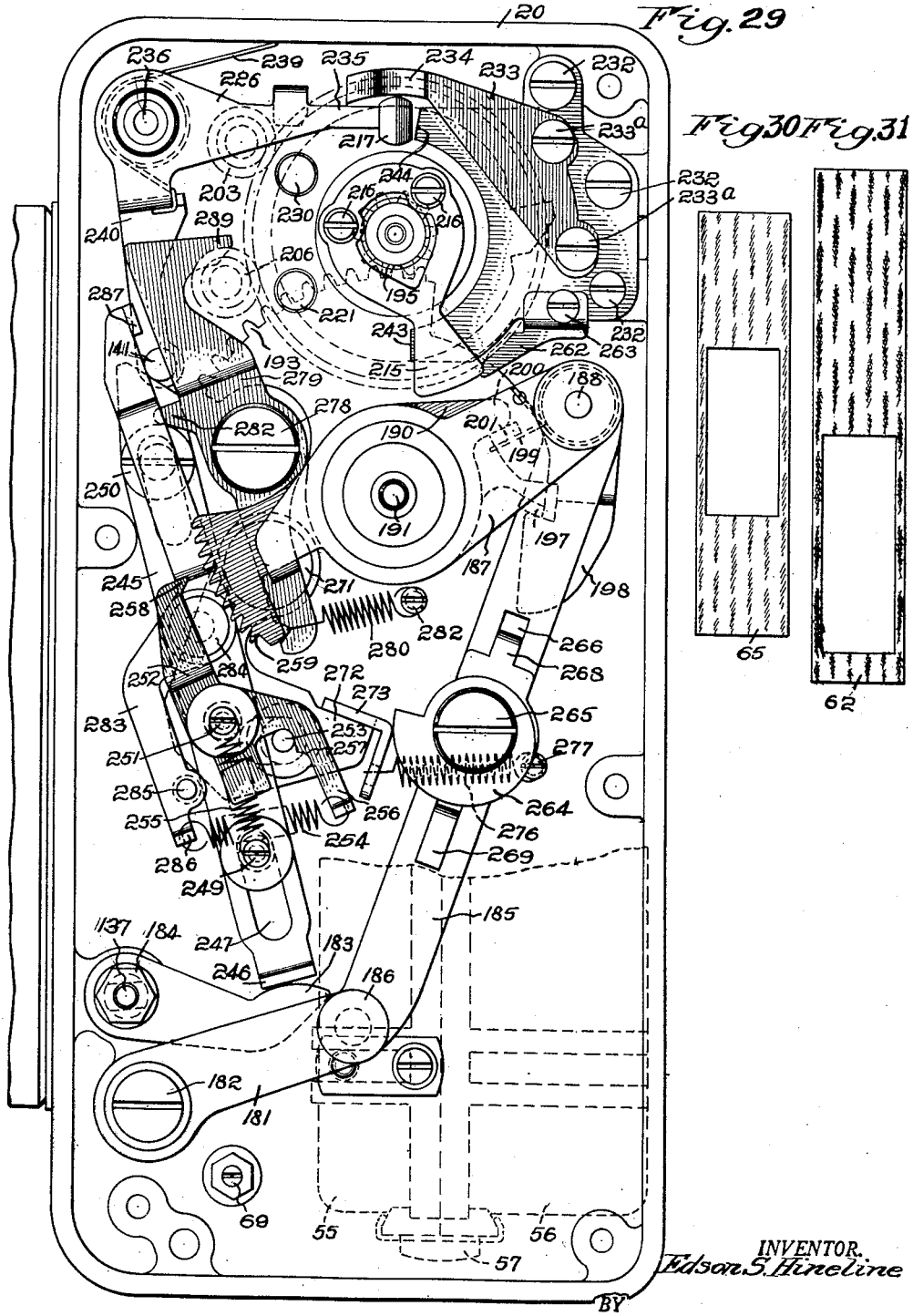

June 12, 1951  E. S. HINELINE  2,556,967
HAND-HELD ROLL-FILM CAMERA WITH INTERLOCKING
FOCAL-PLANE SHUTTER CURTAINS
Filed Aug. 10, 1946  16 Sheets-Sheet 13
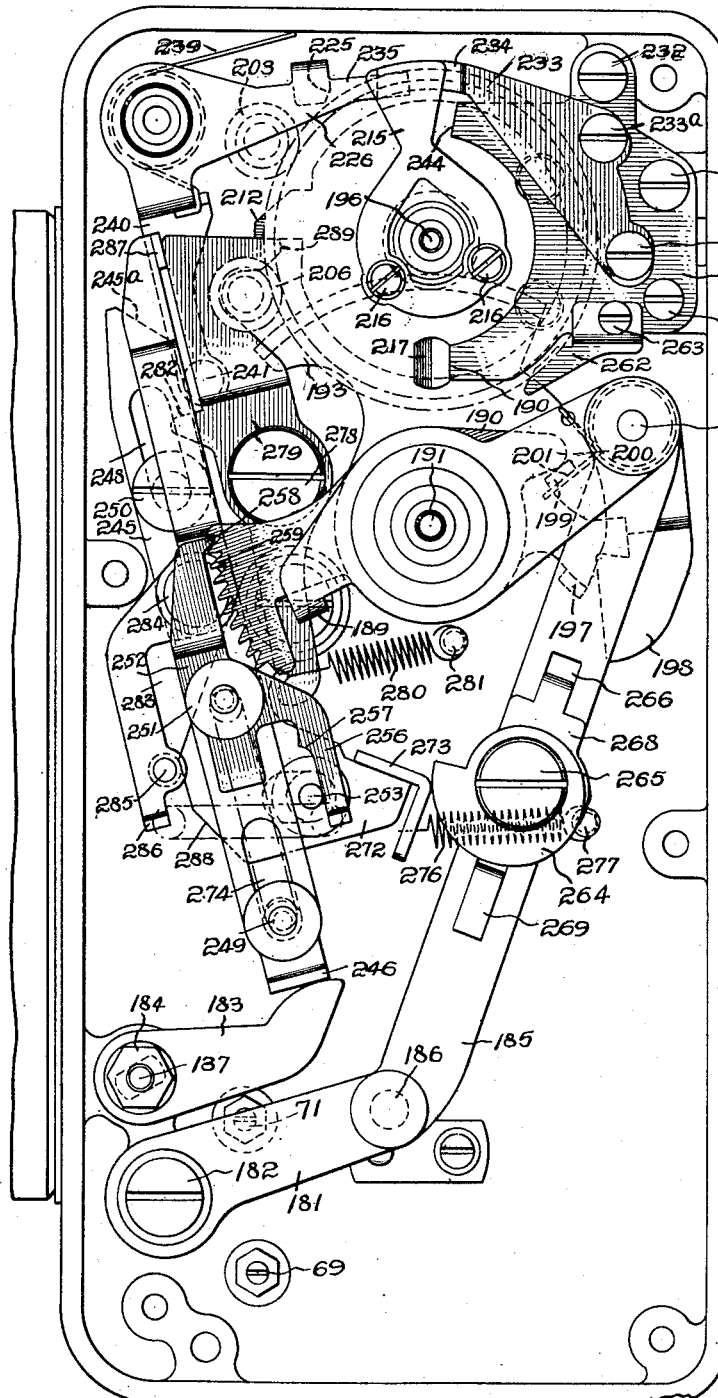
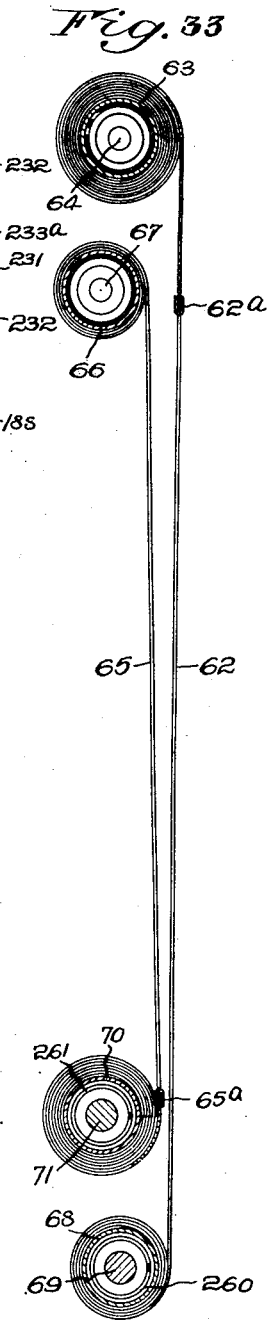
INVENTOR.
Edson S. Hineline
BY
his Attorneys

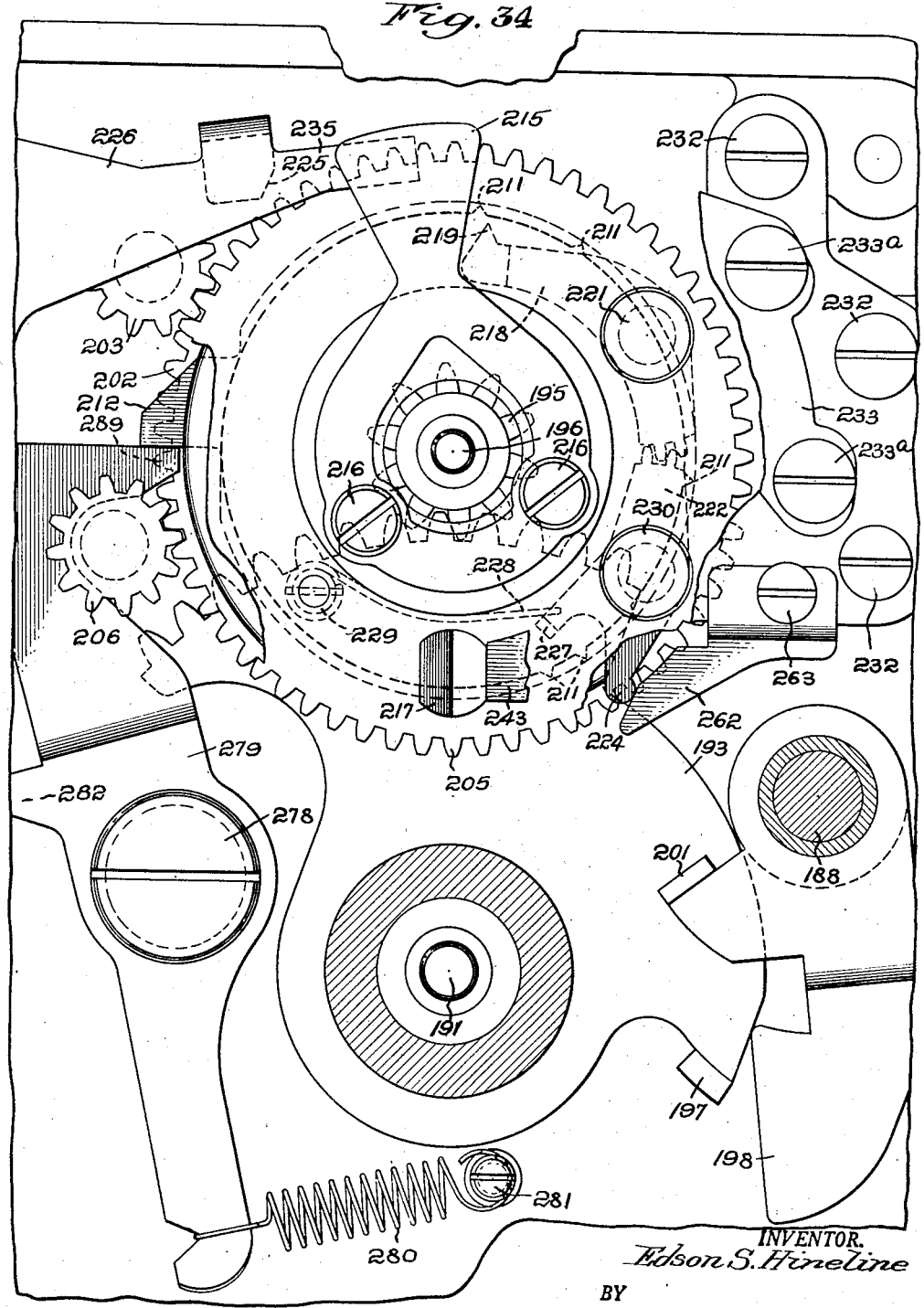

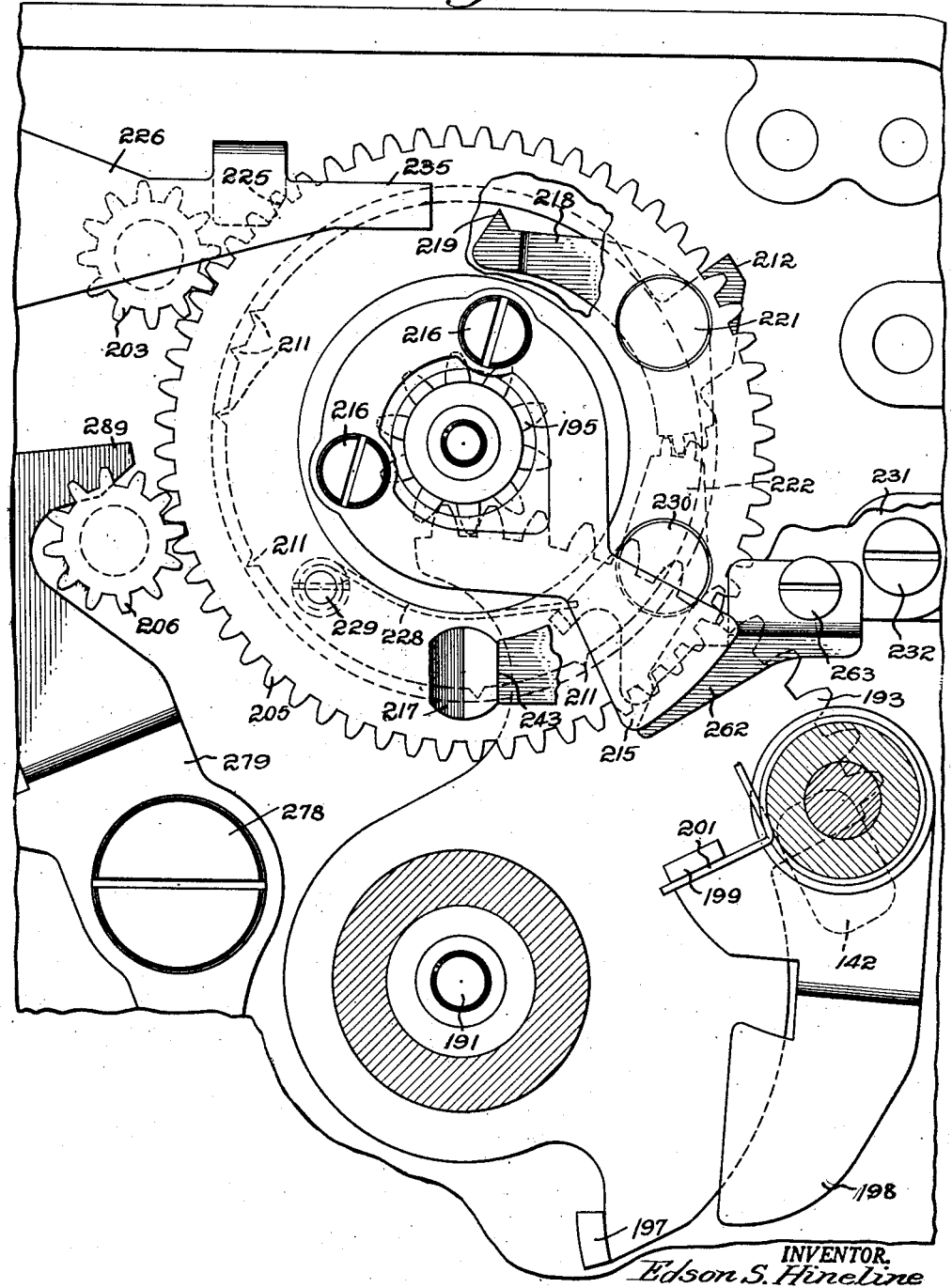

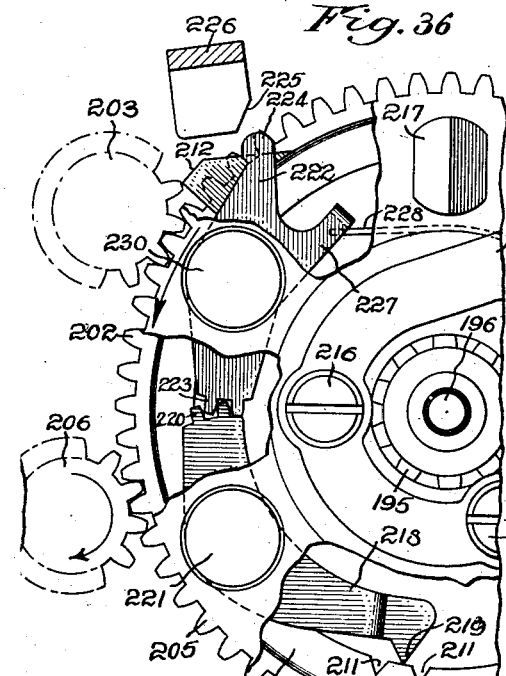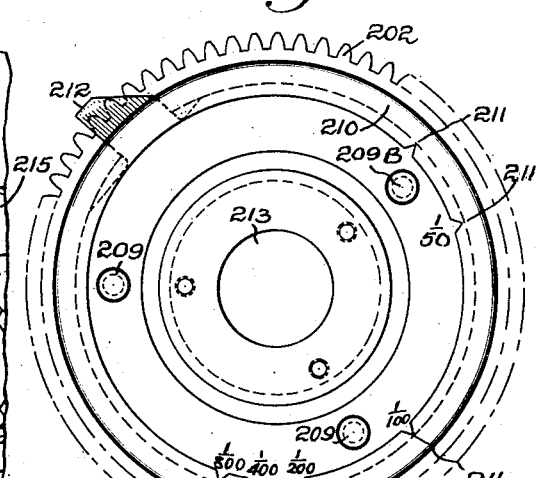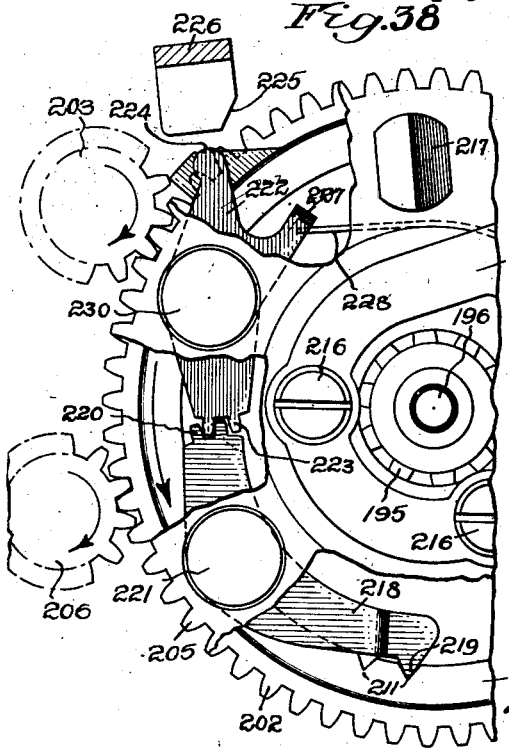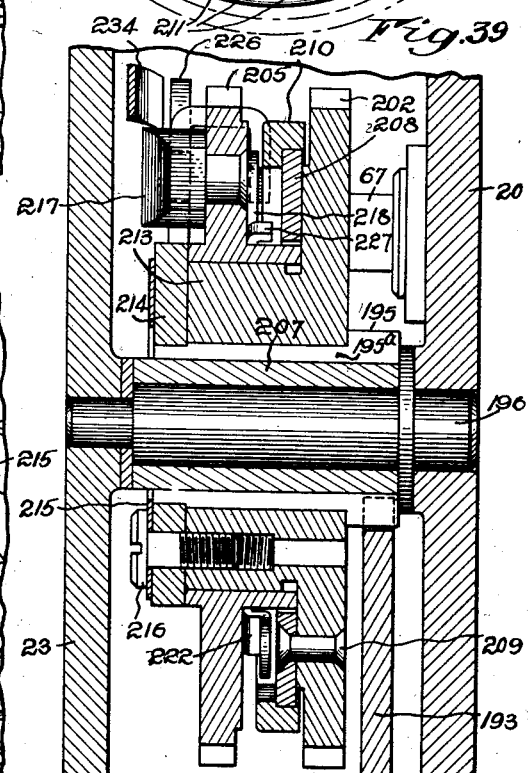

Patented June 12, 1951

2,556,967

UNITED STATES PATENT OFFICE 2,556,967

HAND-HELD ROLL-FILM CAMERA WITH INTERLOCKING FOCAL-PLANE SHUTTER CURTAINS

Edson S. Hineline, Rochester, N. Y., assignor to Grafiex, Inc., Rochester, N. Y., a corporation of Delaware Application August 10, 1946, Serial No. 689,714

38 Claims. (Cl. 95—57)

This invention relates to hand-held focal-plane-shutter cameras having many novel features.

In order that the principle of the invention may be readily understood, I have disclosed a single embodiment thereof in the accompanying drawings, wherein—

Fig. 1 is a right-hand side elevation of the camera showing the view finder in erected position for making an exposure, the film rewind handle being shown in full lines in its normal position and the position thereof at fullest forward travel during film rewind being indicated in dotted lines;

Fig. 2 is a fragmentary top plan view of Fig. 1 clearly showing the position of the shutter setting dial or knob, the shutter being set for bulb exposure;

Fig. 3 is a developed view of the exposure setting dial scale;

Fig. 5 is a front elevation of Fig. 1, with the lens cone removed;

Fig. 6 is a fragmentary rear elevation of Fig. 1, clearly showing the exposure counter window;

Figure 4:
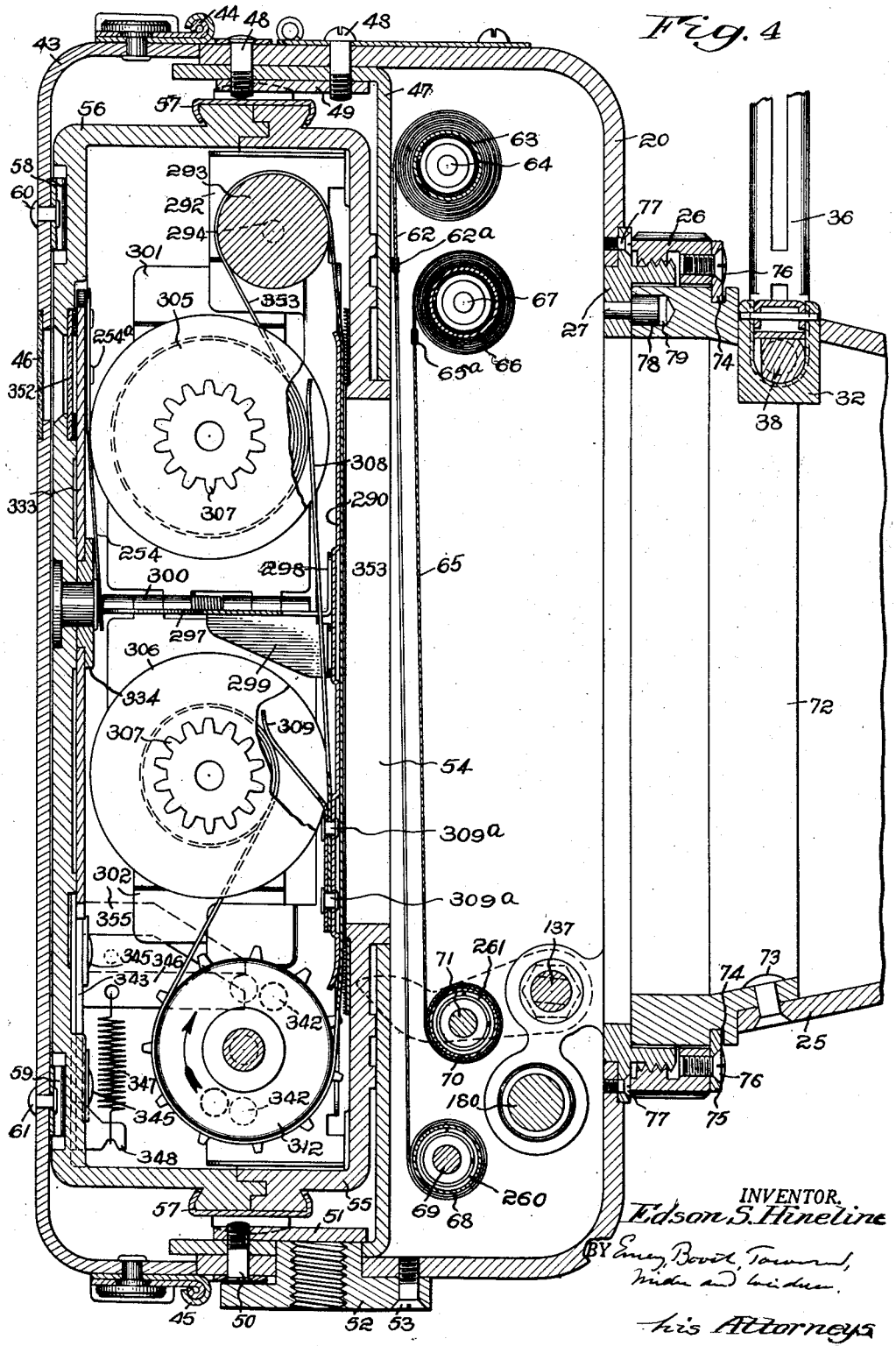
Fig. 4 is a vertical section through Fig. 1 showing the construction of the cone mounting ring and the position of the focal plane shutter curtains, and, as the section extends through the camera magazine, clearly showing the construction of the latter.

Fig. 7 is a view of the right-hand side of the camera, having the mechanism cover plate removed, to show most clearly the film rewind mechanism, the shutter setting mechanism, and the interlock mechanism for the film rewind mechanism, the entire mechanism being shown in the condition wherein the shutter release lever has been operated, thus releasing the shutter, shown in its run-down condition, the interlock being shown as partially operated, but not to be fully operated until the shutter release lever returns to its normal position, the shutter speed setting cam being shown in condition for bulb exposure;

Fig. 8 is a vertical section through Fig. 7, taken on the line 8—8 thereof, and showing the position of the several parts;

Fig. 9 is a view similar to Fig. 7, but showing the shutter release lever as having been partially returned to its normal position, and wherein a further movement of the release lever from the position shown to the normal position will leave the interlock mechanism in the unlocked condition, thus permitting operation of the shutter rewind handle to prepare the camera for a second exposure;

Fig. 10 is a transverse section through Fig. 16 on the line 10—10 thereof;

Fig. 11 is a transverse section through Fig. 16, taken on the line 11—11 thereof;

Fig. 12 is a fragmentary top plan view, partly in section, of the rewind handle shaft and the shutter rewind adjusting plates;

Fig. 13 is a view similar to Fig. 9, but showing the operating handle in its completely forward position, the shutter being in the set condition and the film having been partially fed for the next exposure;

Fig. 14 is a detail plan view showing part of the interlock mechanism as positioned just before the complete rewinding of the film;

Fig. 15 is a view similar to Fig. 9, with some of the parts removed, showing the shutter in rewound condition, but with the shutter speeds set for an instantaneous exposure;

Fig. 16 is a vertical section through Fig. 15 on the line 16—16 thereof;

Fig. 17 is a detail of the film rewinding handle shaft;

Fig. 18 is a view of the left-hand side of the camera with the cover plate removed, showing the mechanism for operating the shutter, which is in rewound condition, prior to making an exposure, and set for an instantaneous exposure;

Fig. 19 is a vertical section through Fig. 18 taken on the line 19—19 thereof;

Fig. 20 is a vertical section through Fig. 18, but taken at a point further to the right on Fig. 18, to show the position of the shutter curtain rewind gears;

Fig. 21 is a detail plan view showing the shutter curtain rewind sector and its operating rewind mechanism;

Fig. 22 is a vertical section through Fig. 21 taken on the line 22—22 thereof;

Fig. 23 is a detail, partly in section, of the shutter rewinding arm, showing the adjusting means for the bulb release;

Fig. 24 is an enlarged detail of the shutter rewinding gears, the shutter release lever and the associated parts directly allied thereto, the shutter being in fully rewound condition and set for an exposure of 1/400 of a second;

Fig. 25 is an underneath view of the second curtain rewind gear, showing the position of the interlock mechanism for locking together the two curtain gears during exposure;

Fig. 26 is an enlarged detail of one of the shutter gears, showing the releasing cam for releasing the shutter gear drive plate just before such shutter gear is fully rewound;

Fig. 27 is a fragmentary detail in section of one of the shutter rewind gears, showing the means for mounting the shutter interlock members;

Fig. 28 is a view similar to Fig. 18, with some of the parts removed, more clearly to show the construction of the shutter operating mechanism, the mechanism being in the position assumed after an exposure and in position for the commencement of the rewinding of the shutter curtains;

Fig. 29 is a view similar to Fig. 18, the shutter being, however, shown in rewound condition and the mechanism being shown as set for bulb exposure;

Fig. 30 is a detail in plan of the first shutter curtain;

Fig. 31 is a similar detail of the second shutter curtain;

Fig. 32 is a view similar to Fig. 28, but showing the mechanism as having been released, and the first curtain as run down to open the exposure aperture, thus completing the first cycle of a bulb exposure;

Fig. 33 is a detail in vertical section of the shutter curtains when the mechanism is in the condition shown in Fig. 32;

Fig. 34 is an enlarged detail in side elevation of the shutter gear mechanism when in the condition shown in Fig. 32;

Fig. 35 is an enlarged detail similar to Fig. 34, but representing the bulb exposure as having been completed due to the release of the shutter release lever;

Fig. 36 is an enlarged detail in side elevation of the shutter rewinding gears, some of the parts having been removed to show the means for interlocking together the two shutter curtain rewind gears during exposure;

Fig. 37 is an enlarged detail in side elevation of one of the shutter curtain rewind gears, and showing the interlock ring;

Fig. 38 is an enlarged detail in side elevation similar to Fig. 36, but showing in the engaged position the shutter curtain interengaging mechanism that locks the two curtains together; and Fig. 39 is a vertical section through the shutter rewind gears, taken on the center line of the rewind gear shaft.

This invention relates to hand-held cameras of novel construction. The camera is of a very compact, dust-tight and moisture-proof construction enabling it to be used under severe operating conditions as, for instance, at the front line in modern warfare, and for that reason it is usually referred to as the "front-line camera." The camera is provided with an adjustable exposure-aperture focal-plane shutter having very simple means for controlling shutter speeds. The camera is also provided with a removable lens cone for the ready interchange of lenses. The view finder is of novel construction. One element of such view finder is carried by the lens cone and, since the proportions of that element of the view finder can be changed to indicate the field covered by the particular lens carried in that cone, the act of changing cones also provides the proper view finder element for use with that lens and cone. The camera is provided with a handle that is also the operating means for rewinding the shutter and advancing the film, and an interlock mechanism is provided for locking the handle in place after the shutter has been rewound and until an exposure has been made, at which time the handle cannot again be operated until the next cycle.

The camera is provided with an interchangeable magazine of very simple construction and of a type that can readily be removed from the camera or be replaced in total darkness. The compact structure is such that the camera can be operated for making separate pictures in very rapid sequence. In fact, the camera has in practice been operated to make separate, non-moving pictures at the rate of two per second.

Among the objects of this invention are the following: to provide a compact, dust-tight, moisture-proof, camera body; to provide a camera having a single means for rewinding the shutter and advancing the film; to provide a shutter speed setting means of simple construction that does not rotate during exposure; to provide a camera having interlocking means so that the camera can be operated only in a proper sequence, thus preventing double exposures, blanks and lapses; to provide interlocking means that make it necessary to operate the film rewind and shutter setting handle throughout its full stroke in both directions before a new exposure can be made, such interlocking means locking the handle in its non-operating condition until after an exposure has been completed; to provide film feeding means operated by the shutter rewinding means and that is positive in its action; to provide a camera for an interchangeable magazine that can be removed and replaced in the camera with a minimum effort on the part of the operator and so simple in its operation that the change can be made in total darkness; to provide a magazine for the camera having a positive film feed mechanism with a pressure pad or plate to hold the film in exact register with the focal plane during exposure; and to provide a camera having a film magazine wherein the exposure counter is an integral part of the magazine, whereby the remaining number of exposures can be determined, whether or not the magazine is in the camera or is removed therefrom.

Referring first to Figs. 1, 2, 5 and 6, the camera body indicated at 20 is substantially rectangular in cross section, and to it is attached a right side cover plate 21 housing the film feed mechanism, which is held to the camera body 20 by screws 22—22, Fig. 1. On the opposite side of the camera body 20, as indicated in Fig. 5, is a left side cover plate 23 housing the shutter control mechanism and held to the camera body 20 by a number of suitable screws (not shown). Fastened to the cover plate 23 is a carrying handle 24. To the front of the camera body 20 a lens cone 25 is attached by means of a lock ring 26 threaded onto a flange 27, and securely holding the cone 25 to the camera body 20. On the right-hand end of the cone 25, viewing Fig. 1, is a lens mount 28 having the usual focusing ring 29 and a diaphragm control ring 30.

Also attached to the camera body 20, as indicated at 31, is one element of a sight finder. To the cone 25, and specifically to bosses 32 carried by the cone, is attached the front element of the sight finder, generally indicated at 33, made up of an upper U-shaped member 34 and two telescopic members 35, one only being shown. The said telescopic members 35 are provided with an elongated slot 36, in which slides a shoulder rivet 37. The lower end of the telescopic member 35 is pivoted on a pin 38 fitted into the boss 32 of the lens cone 25. The said U-shaped member 34 of the sight finder can be collapsed into the telescopic member 35 and folded down onto the lens cone 25 for compactness and portability.

Attached to the cover plate 21 is a shutter release member 39 that is pivoted on a shaft passing through the wall of the cover plate 21 and held thereto by a screw 40. Also attached to the cover plate 21 is a shutter setting knob 41 fitted to a shaft passing through a suitable bearing in the cover plate 21, and carrying an operating handle 42.

Fitted to the back of the camera, and best shown in Fig. 6, is a back member or door, indicated at 43, provided with an upper hinge member 44 and a lower hinge member 45, shown in Figs. 1 and 4. The hinge members used hereon are of the type that permit the door to be pivoted on either hinge member 44 or 45, or the door may be entirely removed. The structure is fully shown in the United States patent to Whitman and Nadel, No. 2,273,455, dated February 17, 1942, and needs no further description here. The camera back 43 is provided with a window 46 for viewing the exposure number.

Fig. 4, being a vertical cross section through the camera, most clearly shows the position of the magazine and also the curtain rollers. There is provided a vertical partition in the camera, indicated at 47, having the upper end bent over to the left, through which pass screws 48, 48, and these in turn are threaded into a retaining member 49. The lower end of the partition plate or member 47 is also provided with a left-hand extending member, through which passes a screw 50 into a retainer plate 51. The screws 48 and 50 also serve to hold to the camera body the hinge members 44 and 45 respectively.

Also attached to the bottom side of the camera body 20 is a tripod socket flange member 52 by means of screws 53, 53. The partition plate or member 47 is provided with an opening, into which a projecting member 54 of the magazine lower casting 55 is fitted. The magazine is made up of two castings, namely, the lower or forward one 55 and the upper or rearward one 56. The said castings 55 and 56 are held together by spring clips 57, 57. The camera magazine made up of the castings 55 and 56 is held in place in the camera by springs 58 and 59 held to the camera back 43 by rivets 60 and 61 respectively. A more complete description of the magazine will be given at a later point.

Still referring to Fig. 4, the second shutter curtain is indicated at 62 and is wound on a rewind spool 63 provided with a shaft 64. The first curtain is indicated at 65, and is provided with a rewind spool 66 having a shaft 67. The lower end of the second curtain 62 is provided with a second or take-up spool 68 having a shaft 69. The lower end of the first curtain 65 is provided with a take-up spool 70 having a shaft 71. These shutter curtains and their respective spools will be again referred to when describing the operation of the shutter.

As shown in Fig. 4, the lens cone 24 is provided with a forwardly extending cylindrical member 72 held to the lens cone 24 by rivets, one of which is shown at 73. The cylindrical member 72 is provided with a groove 74, into which is fitted a ring 75, itself attached to the cone locking nut 26 by screws 76, 76. The flange 27 (Figs. 1 and 4) is held to the camera body 20 by screws 77, 77, and is provided with a locking pin 78 engaging a hole 79 of the cylindrical cone member 72. The cone 24 is attached to the camera body 20 by the threaded clamp nut 26 that is threaded to the flange 27 and tightened in the usual manner. The right side cover plate 21 of the camera body constitutes a mechanism housing for the film rewind mechanism and also for the shutter speed setting and rewind mechanism.

Referring now to Figs. 7 to 17, a film rewind pinion is shown at 80 and is provided with a shaft 81 fitted into a bushing 82 carried in a boss 83 in the camera body 20. The said shaft 81 is provided with a key 84 engaging a driving dog in the film magazine to be later referred to more fully. The pinion 80 and the shaft 81 are held in position by a boss 85 cast integral with the camera cover plate 21. Said pinion 80 meshes with a large gear 86 carried on a suitable stud fitted into a boss 87 cast integral with the said cover plate 21. A retaining screw 88 is threaded into said boss and holds the gear 86 in place.

Attached to the under side of the gear 86, viewing Fig. 7, is a cam plate 89 having peripheral cams 89a (Fig. 14, clearly shown in dotted lines) which is separated from and securely held to the said gear 86 by means of studs 90 and which also serve as a ratchet for advancing the gear 86 in a clockwise direction in a manner now to be described.

Attached to the cover plate 21 by a suitable shoulder screw 91 is a gear sector 92 having, as shown in Fig. 9, an arm 93 extending to the right, and thereto are attached ratchet drive members 94, 95, Figs. 7 and 9, by a suitable shoulder rivet 96. The ratchet drive members 94 and 95 are caused to move inwardly towards the center of the gear 86 by means of a spring 97 fitted around the shoulder rivet 96 and engaging suitable notches in the ratchet drive members 94 and 95. The said gear sector 92 meshes with a second gear sector 98, shown in dotted lines in Figs. 7, 9, 13 and 15, in section in Fig. 16, and in solid lines in Fig. 8.

Referring now to Fig. 16, said right side cover plate 21 is provided with a boss 99 extending to the right, into which are fitted bushings 100 and 101, and fitted thereinto is a shaft 102, shown in detail in Fig. 17. The left-hand end of the shaft 102 is provided with an enlarged cylindrical flange 103, which has part of its periphery cut away, as most clearly shown in dotted lines in Figs. 7, 9 and 15. The ends of said cut-away portion form limiting stops 104 and 105 that coact with a stop plate 106 to limit the motion of the shaft 102 in either direction. Said stop plate 106 is held to the said right side cover plate 21 by rivets 107, 107. The gear sector 98 is attached to the flange 103 and the shaft 102 by drive pins 108, 108 which are provided with large diameter sections 109, 109 that serve as a spacer between gear sector 98 and a shutter rewind plate 110 fitted over an extension 111 of the shaft 102 and caused to rotate with said shaft 102 by means of said pins 108. The function of said shutter rewind plate 110 will be explained presently. The right-hand end of the shaft 102 is provided with milled flats 112 over which is fitted a handle support member 113, Fig. 13, and held thereto by a nut 114 threaded to an extension 115 of the shaft 102. The operating handle 42 is securely attached to the handle support member 113 by screws 116. Any motion of said handle 42 will be transmitted to the gear sector 98 through the shaft 102, the flange 103 and the pins 108.

Again referring to Fig. 7, as the gear sector 98 is caused to rock to and fro through the movement of the handle 42, the gear sector 92 and the arm 93 thereof will also be caused to rotate. When said gear sector 92 rotates in a contraclockwise direction, the ratchet member 94 will be moved in an upward direction, causing the gear 86 to be turned in a clockwise direction because of the ratchet pins 90. When the operating handle 42 is moved all the way forward into the position shown in dotted lines in Fig. 1, the gear sector 92 and the ratchet drive members 94, 95 will be in the position shown in Fig. 13. It will be noted that one of the pins 90 has been moved in a clockwise direction by the ratchet drive member 94, and the ratchet drive member 95 will also be moved in an upward direction to engage another of the ratchet pins 90. As the operating handle 42 is returned to its normal position, the gear sector 92 will be caused to move in a clockwise direction, the ratchet drive members 94 and 95 will be caused to move in a downward direction, and the ratchet drive member 95 will engage one of the pins 90, causing the gear 86 to be rotated in a clockwise direction. The ratchet drive member 94 will also be moved in a downward direction, but will become disengaged from the pin 90 and the parts will be returned to the position shown in Fig. 7. Through the described cycle of operation, the gear 86 will have turned one third of a revolution and the pinion 80 will have turned one complete revolution. The forward and backward movement of the operating handle 42 is limited in its motion by the stop plate 106 and the stops 104 and 105.

There is provided by this invention an interlocking means whereby, after the operating handle 42 has completed a cycle (i. e. a forward movement and a return movement), it is automatically locked and cannot then again be operated until an exposure has been made. In the past there have been interlocks that prevented the operation of the rewinding member until after the shutter trip lever has been pressed. This is quite satisfactory when a winding knob is used and the knob is not used for the support of the camera. In operating the camera herein disclosed, the operating handle 42 becomes one of the supports for holding the camera, and, if it were unlocked the instant the shutter release lever 39 became depressed, the camera would move, thus spoiling a picture. The present invention provides an interlocking means wherein the operating handle 42 is kept in a locked condition until the shutter release lever 39 is allowed to return to its normal position after making an exposure. Therefore, the operating handle 42 is kept locked until after the exposure has actually been made.

To the right side cover plate 21 is fixed a boss, through which passes a shaft 117, Fig. 8, to the right-hand end of which is attached the said shutter release lever 39. To the opposite or left-hand end of the shaft 117 is attached a second lever 118, shown in side elevation in Fig. 7. The said shaft 117 is provided with suitable flats 119 to key the said shutter release lever 39 and the lever 118. Passing through the shaft 117 is the large head screw 40, the opposite end of which is provided with a nut 121, thus clamping the assembly together and causing the shutter release lever 39 and the lever 118 to be locked securely together and to be free to rotate in the boss of the right side cover plate 21. The motion of the lever 118 is limited by stops 122 and 123, integral with said right side cover plate 21, engaging a terminal finger 124 of the lever 118 when it reaches the limit of its travel in either direction. To the lower end of the lever 118 is attached a connecting link 125 by means of a shoulder rivet 126.

To the left-hand end of the connecting link 125, viewing Fig. 7, is attached a bell crank 127 pivoted on a shoulder rivet 128. The connecting link 125 is connected to the bell crank 127 by a shoulder rivet 129. Also pivoted on the shoulder rivet 129 is a floating dog 130, the function of which will be subsequently explained, and which is caused to be turned in a clockwise direction by means of a spring 131, but limited in its motion by a pin 132. To the lower end of the bell crank 127 a second connecting link 133 is attached by a shoulder rivet 134. To the lower end of the said connecting link 133 a lever 135 is attached by means of a shoulder rivet 136, said lever 135 being securely attached to a shaft 137 that passes through the camera body to the shutter mechanism on the opposite side thereof, to be referred to more fully. Upon the extreme lower end of the connecting link 133 is formed an upturned end 138, to which is attached a coiled spring 139, the lower end whereof is attached to a pin 140 threaded into said right side cover plate 21. The said spring 139 tends to rotate the lever 135 in a clockwise direction, the bell crank 127 in a contraclockwise direction, and the shutter release lever 39 in a clockwise direction. When said shutter release lever 39 is operated in a clockwise direction, viewing Fig. 1, the lever 135 and the shaft 137 will be operated in a contraclockwise direction, viewing Fig. 7, thus releasing the shutter in a manner to be more fully explained.

A lever 141 is also attached to said right side cover plate 21 by means of a shoulder rivet 142. The lower end of said lever 141 is provided with a cam follower or dog 143 that engages the cam plate 89. The upper end of said lever 141 is provided with gear teeth 144 that mesh with similar gear teeth 145 of a latch member 146 pivoted on a shoulder screw 147 to the said cover plate 21. The lever 141 is caused to rotate in a contraclockwise direction by a spring 148, one end of which engages an upturned ear 149 of said lever 141, the opposite end thereof engaging a pin 150 threaded into said cover plate 21. A bell crank 151 is also attached to said cover plate 21 by means of a shoulder screw 151a. One end of said bell crank 151 is provided with a finger 152, and the opposite end is provided with a finger 153 and an upturned member 154. The said bell crank 151 is caused to rotate in a contraclockwise direction by means of a coiled spring 155, one end of which is connected to the upturned member 154 and the opposite end to a pin 156 threaded into the said right side cover plate 21. The enlarged flange 103 of the shaft 102, previously referred to, is provided with a notch 157 that is engaged by the said finger 152 when the camera is in the rewound condition, as shown in Fig. 7.

When the camera is in condition for making an exposure, the rewind mechanism will be in the position shown in Figs. 7 and 9. In Fig. 7, the shutter release lever 39 is shown in dotted lines as moved forward—that is, in a clockwise direction viewing Fig. 1. The lever 118 will be rotated in a contraclockwise direction viewing Fig. 7, thereby moving the connecting link 125 and the floating dog 130 in a right-hand direction, viewing Fig. 7. The said floating dog 130 will be moved along the pin 132, it being allowed to move in an upward direction because of the cam face 158 and the spring 131.

It will be noted that the finger 152 of the bell crank 151 still engages the notch 157 of the flange 103. Therefore, the operating handle 42 cannot yet be moved, but as the shutter release lever 39 is released, the lever 118 will be caused to rotate in a clockwise direction, because of the spring 139, causing the bell crank 127 to be rotated in a contraclockwise direction, and the connecting link 125 and the floating dog 130 to be rotated in a left-hand direction, viewing Fig. 7. The said floating dog 130 will engage the upturned member 154 of the bell crank 151, rotating it in a clockwise direction, thus withdrawing finger 152 of the bell crank 151 from the notch 157 of the cylindrical flange 103, as shown in Fig. 9.

Just before the shutter release lever 39 reaches the end of its travel, the terminal finger 153 of the bell crank 151 will pass over the end of the finger 159 of the latch member 146, allowing it to turn in a clockwise direction. At the same time, the cam face 158 of the floating dog 130 will be cammed down by the pin 132, thus withdrawing the floating dog 130 from engagement with the upturned member 154, and thus allowing the bell crank 151 to rotate slightly in a contraclockwise direction until the finger 153 of the bell crank 151 is engaged by the finger 159 of the interlock member 146 which has turned in a clockwise direction because of spring 148, thus holding the finger 152 out of engagement with the notch 157 of the enlarged flange 103.

The operating handle 42 can now be moved in a forward direction, thus rotating the gear 86 in a clockwise direction as previously fully described. When the operating handle 42 reaches the end of its travel in a forward direction, the motion is reversed and said handle 42 is returned to its normal position. This motion will also rotate the gear 86 in a clockwise direction, carrying with it the cam plate 89 provided on its periphery with the cams 89a. Just before the operating or rewind handle 42 reaches the end of its travel in a return direction, one of the said cams 89a will contact with the dog 143 of the lever 141, Fig. 14, moving said lever 141 in a clockwise direction and the latch member 146 in a contraclockwise direction, thus withdrawing the finger 159 of the latch member 146 from the finger 153 of the bell crank 151, which latter will be caused to rotate in a contraclockwise direction because of the spring 155 carrying with it the finger 152, which will engage the notch 157 of the enlarged flange 103 of the shaft 102. The operating handle 42 will now be locked in position and cannot be again operated until the shutter release lever 39 has been operated and released, allowing said operating handle 42 to return to its normal position. The mechanism will now be in the position shown in Fig. 7.

There will next be described the mechanism carried by the right side cover plate 21 for operating the shutter rewind mechanism, and reference will still be made particularly to Figs. 7 to 17.

Carried by the shutter rewind plate 110 is a cam plate 160 that is pivoted on said plate 110 by a shoulder rivet 161. The opposite end of said cam plate is guided by a shoulder rivet 162 that passes through an elongated arcuate opening 163 and into a hole provided therefor in the cam plate 160. A shutter rewind arm or bar 164 having an elongated opening 164a is attached to the rivet 162 by a bushing 165. The said cam plate 160 is provided with a lobe 166 that rides on a cam 167 attached to the shaft 168 which, as shown in Fig. 16, passes through the shaft 102. Fitted to the shaft 168 is a spline sleeve 169 held thereto by a pin 170, shown also in Fig. 10. Fitted over said spline sleeve 169 is the shutter setting knob 41. The shaft 168 is provided with a threaded extension 171, over which is fittted a spring retaining plate 172 held to the shaft 168 by a nut 173.

In a space provided therefor in the shutter setting knob 41 is a coiled spring 174, which causes said shutter setting knob 41 to be forced in a left-hand direction, viewing Fig. 16, because of the spring retaining plate 172. The said shutter setting knob 41 carries a dowel pin 175 that engages any one of a series of holes 176, 176 in the handle support member 113, shown in Fig. 11. Also carried by said handle support member 113 is a pin 177 that serves as a stop for the dowel pin 175 when it reaches the end of its travel in either direction.

The lower end of the shutter rewind arm 164 is pivoted to a lever 178 by means of a shoulder rivet 179, as shown in Figs. 7, 9, 13 and 15. The said lever 178 is attached to a shaft 180 passing through the camera wall and the camera body itself to the opposite side, as will be more particularly described subsequently.

There will next be described the shutter mechanism carried under the left side cover plate 23, and reference will later be made to the just described shutter rewinding mechanism when describing the operation of the shutter.

Referring first to Figs. 18, 19, 20 and 21, to the shaft 180 a lever 181 is attached by a screw 182. The lever 178, the shaft 180 and the lever 181 are securely keyed together. Therefore, any motion transmitted to the lever 178 through the operation of the operating or rewind handle 42 is transmitted through the shaft 180 to the lever 181.

To the shaft 137 a lever 183 is attached by a nut 184. Also attached to the shaft 137 is the lever 135, and therefore any motion transmitted to the said lever 135 through the operation of the shutter release lever 39 is transmitted to the said lever 183. A connecting link or bar 185 is attached to the lever 181 by a shoulder rivet 186 and constitutes a shutter rewind or shutter setting bar or shutter operating bar. The upper end of the said link or bar 185 is connected to a rocker arm 187 by a shoulder rivet 188, and the opposite end of the said rocker arm 187 is provided with an inwardly turned member 189, Fig. 19, that limits the motion in one direction of a shutter release rocker 190. The said rocker arm 187 and the shutter release rocker 190 are pivoted on a pin or stud 191, and between the rocker arm 187 and the shutter release rocker 190 is a spacing washer 192, Fig. 20.

Also pivoted on the stud 191 is a gear sector 193, Fig. 21, that is spaced from the shutter release rocker 190 by a bushing 194, Fig. 20. The said gear sector 193 meshes with a shutter rewind pinion 195 carried on a stud 196 on one wall of the camera body 20. The said gear sector 193 is provided with an upturned formation 197 that is engaged by a latch 198, Figs. 18 and 21, which is carried on the shoulder stud 188 and which forms a pivot for both the bar 185 and the latch 198 on the rocker arm 187. The latch 198 is provided with an upturned ear 199 engaged by a finger 200 of the shutter release rocker 190 and the said latch is caused to be turned in a clockwise direction about the shoulder rivet 188 by a spring 201, one end of which engages said upturned ear 199 and the opposite end of which engages a suitable hole in the rocker arm 187.

The shutter rewind pinion 195 is attached to a second curtain rewind gear 202, Fig. 20, and is carried on the stud 196 of one wall of the camera body 20. Said second curtain rewind gear 202 meshes with a second curtain pinion 203, Fig. 24. Also carried by the stud 196 is a first curtain rewind or take-up gear 205, Fig. 24, that meshes with the first curtain pinion 206. The second curtain pinion 203 is attached to the shaft 64 that carries the second curtain roller 63. The first curtain pinion 206 is attached to the shaft 67 and carries the first curtain roller 66.

It will be noted that when the lever 181 is moved in a contraclockwise direction and the camera operating handle 42 is operated in a contraclockwise direction, as previously described, the gear sector 193 will also be caused to turn in a contraclockwise direction, Fig. 28, because of the co-action of latch 198 with the upturned ear 197 of the gear sector 193. The rewind pinion 195 will be caused to be turned in a clockwise direction, thus winding the second curtain 62 on its take-up roller 63. The first curtain rewind or take-up gear 205 will also be caused to turn in a clockwise direction in the manner now to be described.

Referring now to Figs. 27, 29, 35 to 39, and more particularly to Fig. 39, on the camera wall 20 is mounted, as previously stated, the pin or stud 196 that also projects into the left-hand cover plate 23 of the camera. Over the pin or stud 196 is fitted a bushing 207, and tightly fitted over said bushing is the pinion 195. As shown in Fig. 39, the second curtain rewind gear 202 is securely attached to the hub 195a of pinion 195 having attached to it a ring 208 of washer-like formation by means of rivets 209. Fitted to the ring washer 208 is a cylindrical ring or ring-like member 210 securely attached to the ring washer 208 by any suitable means, such as brazing. The said ring 210 is provided with two internal diameters, one of which is fitted over the ring washer 208, and the inner one of which is provided with a series of notches 211, 211, to be more fully referred to. Also fitted to the ring washer 210 is a dog 212 constituting the bulb release dog.

The second curtain rewind gear 202 is provided with a hub 213, over which is fitted the first curtain rewind or take-up gear 205, so as to be free to rotate thereon, the said gear 205 being held in position by a retainer plate 214, which together with the first curtain rewind or drive spring 215 are held to the hub 213 by means of screws 216, 216. Attached to the upper surface of the first curtain rewind or take-up gear 205 is a drive pin 217, and to the under side thereof, as shown in Fig. 36, is attached a shutter curtain latch or interlock pawl 218 having a dog 219 at one end and gear teeth 220 at the opposite end thereof, it being held to the first curtain rewind or take-up gear 205 by a shoulder rivet 221. Also attached to the under side of the said gear 205, as best shown in Fig. 25, is a rocker arm or interlock member 222 that co-acts with the shutter curtain interlock pawl 218 through gear teeth 223. The opposite end of the rocker arm or interlock member 222 is provided with a finger or pawl 224 that co-acts with a cam 225 carried by a shutter release lever 226, to be further referred to. The rocker arm 222 is provided with a third arm 227 engaged by a suitable spring 228 attached to the first curtain rewind or take-up gear 205 by a shoulder screw 229, Fig. 35, causing said rocker arm 222 to be rotated in a contraclockwise direction, viewing Fig. 36, and causing the shutter curtain interlock pawl 218 to be turned in a clockwise direction. The said rocker arm 222 is attached to the under side of the said first curtain rewind or take-up gear 205 by means of a shoulder rivet 230. The just described means for attaching the shutter curtain interlock pawl 218 and the rocker member 222 to the first curtain rewind or take-up gear 205 are most clearly shown in Fig. 27.

As shown in Figs. 24 and 26, to the camera body 20 a stop plate 231 is attached by means of screws 232, 232, the purpose of said stop plate being to serve as a stop and to limit the motion of the first curtain rewind or take-up gear 205 through the co-action of pin 217. Attached to said stop plate 231 is a cam plate 233 having a finger 234 semicircular in shape and acting as a cam to lift the first curtain rewind spring 215 from the drive pin 217 when said pin reaches the limit of its travel in a clockwise direction.

Referring now to Figs. 4, 20, 21, 26, 28 and 35, as the gear sector 193 is caused to rotate in a contraclockwise direction, the pinion 195, the second curtain rewind gear 202 and the first curtain rewind spring 215 will be caused to rotate in a clockwise direction. Since the said gear 202 is in mesh with the second curtain pinion 203, the shaft 64 and the second curtain roller 63 will be caused to rotate in a contraclockwise direction, viewing Fig. 35, and in a clockwise direction, viewing Fig. 4, thus winding the second curtain 62 on the second curtain roller 63. After the second curtain rewind gear 202 makes a slight rotation in a clockwise direction, the drive pin 217 of the first curtain rewind or take-up gear 205 will be engaged by the first curtain rewind or spring 215, thus causing said gear 205 to be turned in a clockwise direction, turning with it the pinion 206, the curtain roller shaft 207, and the first curtain roller 66 in a contraclockwise direction, viewing Fig. 35, and in a clockwise direction, viewing Fig. 4, thus causing said first curtain 65 to be wound on its curtain roller 66.

The clockwise motion of both the said gears 202 and 205 of the second curtain 62 and first curtain 65 respectively will continue until the said drive pin 217 has passed the latch finger 235 of the shutter release lever 226, at which time the first curtain rewind or drive spring 215 will ride upon the cam 234, thus disengaging said first curtain rewind or drive spring 215 from the drive pin 217, allowing the second curtain rewind gear 202 and the first curtain rewind or drive spring 215 to continue to rotate in a clockwise direction, Fig. 26. The first curtain rewind or take-up gear 205 will be prevented from rotating in a contraclockwise direction because the finger 235 engages the drive pin 217, as shown in Fig. 24.

The shutter release lever 226 is, as most clearly shown in Figs. 18 and 19, of a bell crank formation and is mounted on a stud 236 held to the wall of the camera body 20 by means of a screw 237. Said shutter release lever 226 is provided with a hub 238 (Fig. 19) fast thereto, and said shutter release lever 226 is caused to rotate in a clockwise direction by a spring 239, one end of which is hooked around a lower arm 240 of said shutter release lever 226, and the other end whereof rests against the inner wall of the camera body 20. The said lower arm 240 of the shutter release lever 226 is provided with a pin 241 that co-acts with the shutter release mechanism for tripping the shutter, as will be subsequently more fully explained.

The second curtain rewind gear 202, Fig. 20, is prevented from rotating in a contraclockwise direction by reason of the pinion 195, the gear sector 193, the dog 197 and the latch 198, as shown clearly in Fig. 21.

Referring now to Figs. 9, 11, 15, 16 and 18, when the shutter is rewound and the handle 42 is returned to its normal position, the lever 178 will be in the position shown in Fig. 15, if the shutter had previously been set for an instantaneous exposure and, as in Fig. 9, if the shutter had been set for a bulb exposure. The lever 181 will be positioned as shown in Fig. 18 when the shutter is set for an instantaneous exposure and, as in Fig. 29, when the shutter is set for a bulb exposure. The position of the levers 178 and 181, when in the shutter set condition, is determined by the shutter setting cam 167, Figs. 15 and 16.

The said cam 167 is controlled by the shutter setting knob 41, and the position of the said cam 167 is determined by the position of the shutter setting knob 41 with respect to the rewind handle plate 113, which is provided, as described, with a series of holes 176, Fig. 11. The holes 176 are also marked in Fig. 11 to represent the respective shutter speeds that will be obtained when the pin 175, Figs. 10 and 16, of the shutter setting knob 41 engages one of the holes 176. For example, if the pin 175 engages the hole 176 marked 1/400, the shutter would be in position for making an exposure at 1/400 of a second, and the cam 166 would be in the position shown in Fig. 15. When the shutter setting knob 41 in is position to have its pin 175 engage a hole 176, indicated at B, the shutter would be in condition for making a bulb exposure, and the cam 167 would be in the position shown in Fig. 9. The shutter setting knob 41 carries, on its outer periphery, a scale corresponding to the shutter speeds obtained by the different positions of the shutter setting knob 41. The scale is clearly indicated in the developed view, Fig. 3, and is shown as it appears on the shutter setting knob 41, Fig. 2.

The shutter handle support plate 113 carries an indicating mark 113a to show the proper position for the shutter setting knob 41 when set for any one of the selected speeds. The pin 175 is held in engagement with a hole 176 of the handle support plate 113 by the spring 174. To change the shutter speed, it is only necessary to draw the shutter setting knob 41 in a right-hand direction, viewing Fig. 16, and then turn it in either direction until the selected shutter speed is indicated on the shutter setting scale 41a, Fig. 2. The pin 175 then will engage the proper hole 176 in the handle support plate 113. No further attention will be required respecting the shutter setting knob 41, when making subsequent exposures unless it is desired to change the shutter speed.

It will be noted that when the handle 42 is operated, the shutter rewind plate 110 will also be rotated in a corresponding manner and the plate 160 will also be rotated, but as the shutter setting knob 41 is changed in position, the relative positions of the plate 160 and the shutter rewind plate 110 will be changed, Figs. 9 and 15. In Fig. 15 the shutter is set for an instantaneous exposure, and in Fig. 9 it is set for a bulb exposure. As the shutter setting knob 41 is rotated to a different position, the cam 167 will be correspondingly rotated, thus changing the relative position of the plate 160 with respect to the said plate 110. The said shutter rewind plate 110 always travels through the same distance of rotation, and if the plate 160 were fixed so as to be non-adjustable, the lever 178 would also always travel through the same degree of rotation, but, since the plate 160 is adjustable with respect to the shutter rewind plate 110 and the connecting arm or bar 164 is provided with an elongated slot 164a, the degree of rotation of the lever 178 will be determined by the position of the plate 160 with respect to the shutter rewind plate 110. The reason for adjusting the stroke or rotation of the lever 178 is to control the amount of shutter rewind, thus establishing the shutter aperture in a manner now to be described.

Referring now to Figs. 1, 9, 15, 18, 24, 28 and 35, when the shutter is in its run-down condition after having made an exposure, the shutter parts will be in the position shown in Fig. 35. The second curtain rewind gear 202 will have rotated in a contraclockwise direction, turning with it the shutter rewind pinion, thus rotating the gear sector 193 in a clockwise direction until stopped by the gear sector stop 142, Fig. 28, and the first curtain rewind gear 205 will rotate in a contraclockwise direction until the driving pin 217 is stopped by a stop 243 of the stop plate 231. The shutter mechanism will then be in its run-down condition, as shown in Fig. 35, and the rewind mechanism will be positioned as shown in Fig. 9. The rewind sector 193, Fig. 35, will have rotated in a clockwise direction until stopped by the gear sector stop 142, and the shutter rewind mechanism carried by the right side cover plate 21 will be in the condition shown in Fig. 9.

In order to rewind the shutter, the rewind handle 42 will be moved forward in a contraclockwise direction, viewing Fig. 1. The rewind mechanism will then be positioned as shown in Fig. 13, and the shutter mechanism will be positioned as in Fig. 28. The dog 197 of the gear sector 193 will be engaged by the latch 198 carried on the stud 188. As the rewind handle 42 is returned to normal position, the rewind mechanism carried by the right side cover plate 21 will be positioned as shown in Fig. 15, and the shutter mechanism will be positioned as shown in Figs. 18 and 21. The rewind gear sector 193 will have been rotated in a contraclockwise direction a distance determined by the shutter setting knob 41, the second curtain rewind gear 202 will have been rotated in a clockwise direction by the pinion 195, and the first curtain rewind or take-up gear 205 will also be rotated in a clockwise direction by the drive pin 217 and the first curtain rewind spring 215, as described.

The first curtain rewind or take-up gear 205 will be stopped by a projection 244 of the stop plate 231, but the second curtain rewind gear 202 will continue to turn until the proper amount of curtain has been wound on the second curtain spool 63 to establish the proper slot as determined by the shutter setting knob 41.

Just before the said first curtain rewind gear 205 is stopped, the first curtain rewind or drive spring 215 will be raised by the cam 234 to disengage the said spring 215 from the drive pin 217, and the projecting finger 235 of the bell crank 226 will engage said drive pin 217 and will prevent a contraclockwise rotation of the first curtain rewind or take-up gear 205. The second curtain rewind gear 202 will be prevented from contraclockwise rotation by the latch 198 and the dog 197 of the gear sector 193, Figs. 18 and 24, and the curtains 62 and 65 will be positioned as shown in Fig. 4. The first curtain 65 will have been wound so as fully to cap the exposure aperture 54, and the second curtain 62 will have been wound to a position wherein the strut 65a of the first curtain 65 and the strut 62a of the second curtain 62 will form an exposure aperture depending on the position of the shutter setting knob 41. In this instance, it is assumed that the shutter setting knob 41 will be in a position of 1/400 of a second.

Referring to Figs. 24, 36 and 38, the second and first curtain rewind gears 202 and 205 are shown in Fig. 24 in their wound condition, and therefore the shutter curtain latch or interlock pawl 218 and the rocker arm 222 are in the position shown in dotted lines therein, the dog 219 being held out of engagement with the notch 211 in the ring 210. When the shutter release lever 226 is operated, disengaging the finger 235 from the drive pin 217, the cam 225 of said shutter release lever 226 will be removed from the finger or pawl 224, thereby allowing the interlock pawl 218 to rotate in a clockwise direction, viewing Fig. 24, until the said dog 219 engages the inner surface of the ring 210. At this time, as shown in Fig. 36, the first curtain rewind gear 205 will start to rotate in a contraclockwise direction, but will be stopped from any further movement, inasmuch as the dog 219 will engage the notch 211 after turning only a sufficient distance to allow said dog 219 to drop into the notch 211, as shown in Fig. 38. This interlocking mechanism will again be referred to following the description of the shutter release mechanism.

Reference has previously been made to the shutter release lever 39 and its action with relation to the lever 135, the shaft 137 and the lever 183. Referring now to Figs. 18 and 28, when said shutter release lever 39 is operated, the lever 183 will be caused to rotate in a contraclockwise direction, thus causing a shutter release bar 245 to be moved in an upward direction because of the co-action of the lever 183 with an upturned lower end 246 of said shutter release bar 245, which is provided with elongated openings 247 and 248 and is mounted on shoulder studs 249 and 250, and therefore is free to move in a vertical direction when the shutter release lever 39 is operated to make an exposure. As said shutter release bar 245 is moved in a vertical direction, the pin 241 of the arm 240 of the shutter release lever 226 will be acted upon by an inclined upper end face 245a of said shutter release bar 245, thus causing the said shutter release lever 226 to be rotated in a contraclockwise direction, Figs. 35 and 37, thus removing the latch finger 235 of said shutter release lever 226 from the drive pin 217 and allowing the first curtain rewind gear 205 to rotate slightly until stopped by the interlocking mechanism, previously referred to.

Referring now particularly to Fig. 29, attached to the shutter release bar 245, by a shoulder screw 251, is a second curtain release pawl member 252 that is free to rotate on the shoulder screw 251, but is limited in its rotation by a pin 253 attached to a wall of the camera casing. The said release pawl member 252 is caused to rotate in a clockwise direction by a coiled spring 254, and said shutter release bar 245 is caused to move in a downward direction by a spring 255, one end of which is attached to the shoulder stud 251, and the opposite end whereof is attached to the shoulder stud 249. As the shutter release bar 245 is caused to move in an upward direction, the release pawl member 252 will be caused to rotate in a clockwise direction by the spring 254. An arm 256 is provided with a notch 257 that will allow the said release pawl member 252 to rotate when said shutter release bar 245 has been moved in an upward direction sufficiently far for the notch 257 to pass the pin 253. A nose 258 of the said release pawl member 252 will then engage one of the ratchet teeth 259 of the shutter release rocker 190. A continued movement in an upward direction of shutter release bar 245 will cause said shutter release rocker 190 to be rotated in a clockwise direction until the finger 200 engages the upturned end 201 of the latch 198, which will now be rotated in a contraclockwise direction until upturned formation or end 197 of the gear sector 193 is disengaged from the latch 198. This will allow the gear sector 193 to turn in a clockwise direction, and the shutter rewind pinion 195 will turn in a contraclockwise direction, as will the second and first curtain rewind gears 202 and 205, thus allowing the curtains to run down.

The reason for the large number of teeth 259 on the shutter release rocker 190 is to provide means whereby the said shutter release rocker 190 will be engaged by the nose 258 of the second curtain release pawl member 252, regardless of the extent of the rewinding of the second curtain 62 to form different curtain apertures. It has previously been stated that the position of the gear sector 193, when the shutter curtains are fully wound, will be determined by the setting of the shutter setting knob 41. Therefore, the shutter release rocker 190 will assume different positions for different curtain settings. It is therefore necessary to provide a number of teeth 259 so that, no matter what position the shutter release rocker 190 assumes, there will always be a tooth in position to be engaged by the nose 258 of the release pawl member 252.

I will now review the operation of the shutter when making an instantaneous exposure and in doing so will refer to Figs. 4, 15, 18, 20, 35, 36 and 38.

The shutter setting knob 41 will be set into position for an exposure of 1/400 of a second. The pin 175 of the shutter setting knob 41 will engage a hole 176, also marked 1/400 of a second, in the handle support member 113. This will properly position the cam 167 to cause the proper throw of the gear sector 193, thus providing the proper exposure aperture in the shutter curtains 62 and 65. The cam 167 will be in the position shown in Fig. 15. The shutter is rewound in the manner previously described, by advancing the operating handle 42 in a forward direction as far as it will go and then returning it to its starting position. This will have fully rewound the shutter, and the shutter curtains 62 and 65 will be positioned as shown in Fig. 4.

To make an exposure, the shutter release lever 39 is pressed by the operator, and the shutter release bar 245 will be moved in an upward direction, viewing Fig. 18, until the inclined end cam face 245a engages the pin 241 of the lower arm 240 of bell-shaped shutter-release-lever crank 226. The finger 235 will be disengaged from the drive pin 217. At the same time the cam 225 will be removed from contact with the finger or pawl 224 of the rocker arm or interlock member 222, allowing the dog 219 of the shutter curtain latch or interlock pawl 218 to be rotated until it is stopped by the inner face of the ring 210, Fig. 36. As soon as the drive pin 217 is released by the finger 235, the first curtain rewind gear 205 will rotate slightly in a contraclockwise direction until the dog 219 of said latch or interlock member 218 engages the notch 211 in the ring 210, Fig. 41. The said first curtain rewind gear 205 will be held from further movement, as will the first curtain pinion 206.

A further movement in an upward direction of the shutter release bar 245 will cause the engagement of the nose 258 of the second curtain release member 252 with one of the notches 259 of the shutter release rocker 190, causing the latch 198 to be turned in a contraclockwise direction and disengaging the latch 198 from the upturned formation 197 of the gear sector 193. Both the second and first curtain rewind gears 202 and 205 will now turn in a contraclockwise direction, and the second and first curtain pinions 203 and 206 will be turned in a clockwise direction, as will the second and first curtain rollers 63 and 66, and the curtains 62 and 65 will therefore be wound up on the curtain rollers 68 and 70 because of curtain roller springs 260 and 261, respectively. The said rewind gears 202 and 205 will continue to rotate in a contraclockwise direction until said first curtain gear 205 is stopped by reason of the drive pin 217 contacting with the stop plate finger 243 of the stop plate 231, Fig. 35.

At this time the finger or pawl 224 of the interlock member 222 will be cammed by a cam plate 262 carried on the stop plate 231 and held thereto by a screw 263. The said rocker arm or interlock member 222 will be caused to rotate in a clockwise direction, and the curtain latch or interlock pawl 218 will be caused to rotate in a contraclockwise direction, thus disengaging the dog 219 from the notch 211 of the ring 210 carried by the second curtain rewind gear 202, which will then be allowed to continue its clockwise rotation until the gear sector 193 is stopped by the stop block 142. This will complete the exposure and allows the second curtain 62 to cap the first curtain 65. The curtains and shutter mechanism will then be in position ready to be rewound for a second exposure, and the shutter mechanism will be in the condition shown in Fig. 35.

To make a second exposure, it will be necessary to move the operating handle 42 in the manner previously described. The shutter mechanism will then be restored to the condition shown in Figs. 18 and 20, and the two curtains 62 and 65 will be in the condition shown in Figs. 4 and 20.

Additional mechanism is required for a bulb exposure. I will first describe such additional mechanism and then will give a resume of the shutter operation in making a bulb exposure, and in doing so I will refer to Figs. 20 to 23 and 28.

To the shutter-rewind setting or operating bar 185 an eccentric cam member 264 is attached by means of an eccentric shoulder screw 265, Figs. 20, 23, and 28. The said shutter-rewind setting or operating bar 185 is provided with elongated openings 266 and 267, into which are fitted retainer plates 268 and 269. The cam member 264 and the retainer plates 268 and 269 are held to the shutter-rewind setting or operating bar 185 by means of the screw 265 and a nut 270. Carried on a shoulder screw 271, best shown in Figs. 21 and 22 is an L-shaped member 272 having an upturned L-shaped formation 273, said member 272 being provided with an elongated opening 274, through which passes the pin 253, which is provided with a retaining flange 275 for holding said L-shaped member 272 in place, but free to rotate on the shoulder screw 271, within the limits provided by the elongated opening 274. The said L-shaped member 272 is caused to move in a contraclockwise direction by a coiled spring 276, one end of which is attached to the upturned L-shaped formation 273, the opposite end being attached to a screw 277 threaded into the camera housing wall or body 20.

Carried on a shoulder screw 278, Figs. 21 and 22, is a bulb stop or release lever 279. To the lower end of said bulb stop or release lever 279 is attached a coiled spring 280, the opposite end of which is attached to a pin 281 threaded into the camera housing wall 20. The said spring 280 normally causes the bulb stop or release lever 279 to be rotated in a contraclockwise direction until stopped by reason of a finger 282 of the bulb stop or release lever 279 contacting with the screw 250.

Referring now to Figs. 18, 19 and 32, to the shutter release bar 245 is attached an S-shaped lever 283 by means of a shoulder rivet 284. The lower end of said S-shaped lever 283 is provided with a pin 285, to be further referred to, and with an upturned end 286 to which the coiled spring 254 is connected, and which spring 254 causes the S-shaped lever 283 to be rotated in a contraclockwise direction. The upper end of said S-shaped lever 283 is provided with an upwardly extending member 287 that engages the bulb stop or release lever 279 when said S-shaped lever 283 is rotated in a clockwise direction. The pin 285 of said S-shaped lever 283 is acted upon by a cam face 288, Fig. 32, of the L-shaped member 272 when the latter is rotated in a clockwise direction by the cam member 264 carried on the shutter-rewind setting or operating bar 185.

I will now describe the operation of the shutter when the shutter setting knob 41 is set in a position to indicate a bulb exposure, and in doing so I will refer to Figs. 7, 9, 11, 29, 32, 33, 34 and 37.

The pin 175 of the shutter setting knob 41 will engage a hole 176 of the handle support plate 113, also indicated at B in Fig. 11. The shutter setting cam 167 will be in the position shown in Figs. 7 and 9. The shutter is rewound in the manner previously described. The shutter mechanism will then be as shown in Fig. 29. The cam 264 carried by the connecting link or bar 185 will contact with the upturned L-shaped formation 273 of the L-shaped member 272, causing it to rotate in the clockwise direction. The pin 285 will be contacted by the cam face 288 of said L-shaped lever 272, causing the S-shaped lever 283 to be rotated in a clockwise direction. The upturned or upwardly extending member 287 of the S-shaped lever 283 will contact with the bulb stop or release lever 279 and cause it to be rotated in a clockwise direction so that a nose 289 (Fig. 37) will be in position to engage the dog 212 carried by the second curtain rewind gear 202.

The shutter release lever 39 is operated in the usual manner to make an exposure thus causing the lever 183 to be rotated in a contraclockwise direction, Fig. 32. This will cause the shutter release bar 245 to be moved in a vertical direction, thus causing the shutter release lever 226 to be rotated in a contraclockwise direction through the action of the cam face 245a and the pin 241. The first curtain rewind gear 205 will now be allowed to rotate slightly until the nose 219 of the curtain latch or interlock pawl 218 engages the one of the notches 211 indicated as "bulb," Fig. 37. A further movement of the shutter release bar 245 will cause the nose 258 to engage one of the teeth 259 of the shutter release rocker 190, thus operating the latch 198 to release the dog 197 of the gear sector 193. The shutter curtain gears will now run down until stopped by the dog 212 of the second curtain rewind gear 202 by the nose 289 of the bulb stop or release lever 279.

The mechanism will now be in the position shown in Fig. 32, and the curtains 62 and 65 will be positioned as shown in Fig. 33. The shutter will remain in the "open" condition as long as the shutter release lever 39 is held in a forward position by the operator. As the shutter release lever 39 is released, the lever 183 will rotate in a clockwise direction. Because of the spring 255, the shutter release bar 245 will now be moved in a downward direction, carrying with it the S-shaped lever 283 and the pin 285, and as the shutter release bar 245 continues to move in a downward direction, the said S-shaped lever 283 will be rotated in a contraclockwise direction by the coiled spring 254, thus removing the upturned end 287 of the said S-shaped lever 283 from contact with the bulb stop or release lever 279, which will then be rotated in a contraclockwise direction by the spring 280, withdrawing the nose 289 from the dog 212, thus allowing the second curtain rewind gear 202 to continue to rotate in a contraclockwise direction to cause the second curtain 62 to close.

As the shutter approaches its full open condition and just before the drive pin 217 reaches the stop 243, the nose 224 of the interlock member 222 will ride up on the cam 262, thus withdrawing the nose 219 of the lever 218 from the notch 211, Fig. 34. Upon withdrawal of the nose 289 from the dog 212, the second curtain rewind gear 202 will be allowed to rotate in a clockwise direction to allow the second curtain 62 to close after the release lever 39 has been released. The shutter mechanism will then be in the position shown in Fig. 35, and the operation of the shutter setting handle 42 will prepare the camera for a second exposure if the shutter setting knob 41 remains in the same position.

The film feeding means, the shutter releasing means and the shutter rewinding means herein disclosed are all intimately associated in action and are operatively connected to the operating handle 42 and to the interlock means. By the herein disclosed invention there are provided film feeding means, a shutter, shutter releasing means, shutter rewinding means, an operating handle operatively connected both to the film feeding means and to the shutter rewinding means, and an interlock operatively connected to the said operating handle and thereby caused to lock the said operating handle in place after the shutter has been rewound by said operating handle and until an exposure has been made by the shutter whereby the said operating handle cannot again be operated to feed the film or to rewind the shutter until the next cycle of camera operations.

This invention is clearly distinguished from that disclosed in United States Patent No. 2,362,813, November 14, 1944, wherein I am one of the joint inventors. In that patent, which is concerned with aerial photography, and as fully described on page 11 of the specification thereof, the operating handle 39 is first turned in one direction to feed the film for the next exposure and to rewind the single curtain constituting the shutter. The handle 39 is then returned to its former position and immediately becomes locked in that position and cannot be operated until after the shutter has been released. As soon as the operating handle 39 becomes so locked, the shutter release lever 40 can be operated for releasing the shutter which thereupon runs down, the capping gates having been duly opened. The running down act of the single curtain unlocks the shutter operating handle 39 and locks the release lever 40.

In the present invention there is provided a shutter release lever but no interlock especially therefor, as is provided for the shutter release lever 40 in said patent. In the present invention the operating handle 42 becomes automatically locked immediately after having made a forward movement and a return movement and cannot again be operated until an exposure has been made. The said operating handle 43 is kept locked until the shutter release lever 39 has returned to its normal position after the exposure has actually been made.

It will be evident that in the present invention the film feeding means and the shutter operating means intimately cooperate.

Having thus described one embodiment of my invention, it is to be understood that although specific terms are employed, they are used in a generic and descriptive sense and not for purposes of limitation, the scope of the invention being set forth in the following claims.

I claim:

1. In a photographic camera having shutter winding mechanism and shutter release mechanism, a focal plane shutter consisting of two self-capping curtains each having winding pinions and each having an opening, which openings together constitute the exposure opening, and means to wind said curtains, including an operating rewind handle, a shutter rewind bar 164 connected to and moved lengthwise by movement of said rewind handle, a lever arm 178 connected to and operated by lengthwise movement of said bar 164, a shaft 180 on which said lever arm 178 is mounted and which is rocked to and fro by movement of said handle, a lever arm 181 mounted on said shaft, a link 185 connected to said lever arm, a gear sector 193 operatively connected to said link, a shutter rewind pinion 195 in meshing relation with said sector, a second curtain rewind gear 202 attached to and rotating with said shutter rewind pinion 195 and in meshing relation with a winding pinion of said second curtain, and a first curtain rewind gear 205 coaxial with said second curtain rewind gear 202, and in meshing relation with a winding pinion of said first curtain and means for operatively connecting rewind gears 202 and 205 so that they rotate together.

2. In shutter controlling mechanism for a photographic camera having shutter rewinding mechanism, shutter release mechanism and shutter aperture setting mechanism to constitute a complete curtain shutter operating mechanism, and wherein there are provided two shutter curtains in close parallelism and respectively provided with second curtain and first curtain shutter rewind gears 202 and 205 having meshing relation with the two curtain rewind spools, and both rewind gears rotatable oppositely to wind and unwind the said shutter curtains, and as a cooperating subcombination of said complete curtain shutter operating mechanism for effecting release of said shutter curtains, means for locking said rewind gears against rotation in unwinding direction, a pivoted shutter release rocker having at least one ratchet tooth, and operatively connected to said locking means to release the same when said release rocker is rocked in one direction, a lengthwise movable, shutter release bar, a shutter release lever connected to be moved by lengthwise movement in one direction of said shutter release bar, said shutter release lever normally locking the shutter rewind gear 205 against rotation in unwinding direction, a shutter operating lever operatively connected to said shutter release bar to move the said lengthwise movable bar in effecting shutter release, and a second curtain release pawl member carried by said shutter release bar and having a projecting formation to engage the said ratchet tooth formation on said shutter release rocker to rotate said rocker to releasing position on further lengthwise movement of said shutter release bar in said one direction, thereby to permit running down of the said two curtains.

3. Shutter controlling mechanism in accordance with claim 2, but wherein the shutter release bar is moved lengthwise in one direction by movement of the shutter operating lever, and wherein spring means is provided to move said shutter release bar in the opposite direction.

4. Shutter controlling mechanism in accordance with claim 2, but wherein the said second curtain release pawl member is pivotally mounted for rotative movement upon said shutter release bar.

5. Shutter controlling mechanism in accordance with claim 2, but wherein the said shutter release rocker has cooperatively associated therewith a latch and a gear sector for movement of the latter, whereby through the said movement of the shutter release bar by the shutter operating lever the gear sector is disengaged from said latch, allowing said gear sector to be turned, thereby allowing both curtains to run down.

6. Shutter controlling mechanism in accordance with claim 2, but wherein the said shutter release rocker is provided with a plurality of adjacent ratchet teeth, so as to insure engagement therewith by the second curtain release pawl member regardless of the extent of rewinding of the first curtain of said two shutter curtains to form different curtain apertures.

7. Shutter controlling mechanism in accordance with claim 2, but wherein a shutter setting knob having a plurality of different rotative shutter setting positions is associated with the said shutter release rocker by cooperating, operatively-connected parts, and by means of which shutter setting knob the said shutter release rocker will be differently positioned for different curtain settings.

8. In bulb-exposure shutter-controlling mechanism for a two-curtain shutter of a photographic camera having shutter rewinding mechanism, shutter release mechanism and shutter aperture setting mechanism to constitute a complete curtain shutter operating mechanism, which curtain shutter is provided with a first curtain rewind gear 205 and with a second curtain rewind gear 202 having a bulb release control dog 212, and as a cooperating sub-combination of said complete curtain shutter operating mechanism a shutter rewind or setting lengthwise-movable bar 185, an operating handle 42, operating connections between said operating handle 42 and said shutter rewind or setting bar 185 for operating the latter and operating connections between the latter and the said shutter curtain rewind gear 205 and with a second curtain a cam 264 fast on the said bar 185, a member 272 pivotally mounted on a fixed part of the camera and adapted to be engaged and rotated by said cam 264 in the lengthwise operating movement of said rewind or setting bar 185 by the said operating handle 42, a shutter release bar 245 having thereon a lever 283 provided with a pin formation 285 to be engaged and rotated by said pivotally mounted member 272, and a bulb stop or release lever 279 engaged and rotated by said lever 283 on the shutter release bar, and thereby brought into operating engagement with the said bulb release dog 212 of the said second curtain rewind gear 202.

9. Shutter controlling mechanism in accordance with claim 8, but wherein there is provided a shutter release lever 39, a lever 183 operated thereby, and operatively related to said shutter release bar 245 to move it lengthwise, and a shutter release lever 226 moved by said bar 245 and operatively related to said two-curtain shutter so as to release the same.

10. Shutter controlling mechanism in accordance with claim 8, but wherein a spring 276 is provided to rotate said pivotally mounted member 272 in a direction opposite to that in which it is moved by said cam 264 in the lengthwise movement of said shutter rewind or setting bar 185.

11. Shutter controlling mechanism in accordance with claim 8, but wherein a spring 289 is provided to cause said bulb stop or release lever 279 to be rotated in a direction opposite to that in which it is rotated by the said lever 283 on the said shutter release bar.

12. Shutter controlling mechanism in accordance with claim 8, but wherein an adjustable shutter setting knob 41 is provided, a shutter setting cam 167 positioned by said knob 41, an operating shaft carrying said cam 167 and wherever said knob 41 is received for rotative adjustment, and operative connections between said cam 167 and said shutter rewind or setting bar 185 for effecting the rewinding of said two-curtain shutter.

13. A focal plane shutter and operating means therefor for a photographic camera consisting of two self-capping curtains, each having an opening, which openings together constitute the exposure aperture; winding mechanism for said shutter, release mechanism for said shutter including a shutter release lever, and speed setting mechanism for said shutter including means for varying the size of such exposure aperture and by which an exposure aperture of predetermined size may be provided, the said camera having an operating shaft, operating connections between said shaft and the winding mechanism and the said release mechanism, and the said shutter speed setting mechanism of said shutter; an operating handle operatively supported by said shaft for forward and return movement only and by such forward and return movements of which handle the said shaft is turned swingingly to and fro, said operating handle constituting one of the supports for holding and supporting the camera for operation, the means to vary the size of the exposure aperture including means to change the angular relation of the said operating handle to the said operating shaft, so that the size of the exposure aperture varies in accordance with the angular movement of the operating shaft, and interlocking means to lock automatically the said handle after each swinging back-and-forth movement thereof until the shutter release lever is allowed to return to its normal position after the making of an exposure and means connected to the said shutter release lever for disengaging the handle locking means when the shutter release lever has returned to its normal position.

14. A focal plane shutter for a photographic camera consisting of two self-capping curtains in close parallelism and each having an opening, which openings together constitute the exposure aperture, means for varying the size of such exposure aperture and by which an exposure aperture of predetermined size is thereby provided; an operating shaft for the functioning movements of said shutter, said shaft having only a to-and-fro movement; co-acting cooperating combined connections from said operating shaft to said shutter to wind the shutter and to release the shutter, an operating handle upon said shaft for turning said shaft rotatively to and fro; said operating handle also constituting one of the supports for holding and supporting the camera for and during operation thereof, including shutter movements, said handle, for the purpose of carrying out the said shutter functioning movements, having only a swinging forward-and-return movement, thereby turning said shaft rotatively to and fro, said connections for releasing the shutter including a shutter release lever; the means to vary the size of the exposure aperture including means to change the angular relation of the said operating handle to the said operating shaft, so that the size of the exposure aperture varies in accordance with the angular movement of the operating shaft, and interlocking means to lock automatically the said operating handle after each swinging forward-and-return movement thereof, until the said shutter release lever returns to its normal unreleased position, after the making of an exposure, and means connected to the said shutter release lever for disengaging the handle locking means when the shutter release lever has returned to its normal position.

15. In photographic shutter mechanism provided with shutter winding means, shutter release mechanism and shutter operating setting mechanism, a focal plane shutter for a photographic camera, consisting of a first curtain and a second curtain together constituting two self-capping curtains in close parallelism and each having an opening, which openings together constitute an exposure aperture, and means for winding said two curtains and for keeping them locked together while being wound, said winding and locking means including a stud 196 mounted upon a part of the camera body, a bushing 207 fitted on said stud 196, a pinion 195 fitted over said bushing 207, means to rotate said pinion for rotating the rewind gear, a second curtain rewind gear 202 attached to said pinion 195, a ring 208 attached to said second curtain rewind gear 202, a ring-like member 210 fitted to said ring 208 and having upon an inner surface thereof a series of circumferentially arranged notches 211, a bulb release dog 212 attached to said ring-like member 210, and cooperating means to operate said bulb release dog, the said second rewind gear 202 having a hub 213, a first curtain rewind take-up gear 205 mounted on and free to rotate on said hub 213, an interlock pawl 218 pivoted upon said first curtain rewind gear 205 to engage said notches on said second curtain rewind gear 202 to interlock said two curtain rewind gears, said two curtains having rewind spools provided with pinions in meshing relation with said two rewind gears 205 and 202 respectively.

16. Camera shutter winding means in accordance with claim 1, but wherein the said sector 193 is provided with an extending formation 197, and wherein there is provided a latch 198 engaging said extending formation, the said formation locking the said sector by engagement with said latch, and wherein there is provided a shutter release rocker 199 co-axially mounted with respect to said sector and engaging said latch member.

17. As a cooperating sub-combination of elements cooperating in a photographic camera with a curtain shutter itself having, in combination, rewinding mechanism and releasing mechanism and shutter aperture setting mechanism, said shutter rewinding mechanism and shutter aperture setting mechanism including an operating shaft for rewinding said shutter and operatively connected thereto and having an inner shaft 168 operatively connected to said operating shaft, and a shutter aperture setting cam 167 on the said inner shaft, an operating handle mounted upon said operating shaft by which a manually imparted rocking-to-and-fro movement may be imparted to said operating shaft, a shutter rewind plate fast upon said operating shaft and rotated correspondingly through the said angular extent, to establish the shutter aperture, said plate being operatively connected to the shutter for effecting rewinding of said shutter, a cam plate pivoted on said shutter rewind plate for movement relative thereto, a shutter rewind arm connected to said plate, the said cam plate being provided with an operating formation, the said cam on said inner shaft engaging said operating formation 166, thereby to rock said cam plate, a shaft to which said shutter rewind arm is connected at one end, and operating connections between said last named shaft and said shutter rewinding mechanism, whereby movement of said operating handle moves lengthwise said shutter rewind arm 164, and through connections therefrom operates the shutter rewinding mechanism.

18. Shutter rewinding mechanism and shutter aperture setting mechanism for a photographic camera in accordance with claim 17, but wherein the said second mentioned or inner shaft is provided with a shutter setting knob connected to said cam for controlling the position of said cam and having means for variably connecting said shutter setting knob to said operating handle.

19. Shutter rewinding mechanism and shutter aperture setting mechanism for a photographic camera in accordance with claim 17, but wherein shutter setting knob connected to said cam for controlling the position of said cam and having a projecting pin, and wherein there is a handle support member having a series of arcuately spaced holes to be engaged selectively by said projecting pin for varying the shutter aperture in accordance with the angular movement of the operating shaft, the said handle support having the said operating handle connected thereto.

20. Shutter rewinding mechanism and shutter aperture setting mechanism for a photographic camera in accordance with claim 17, but wherein the said second mentioned or inner shaft is provided with a shutter setting knob for controlling the position of said cam and having a projecting pin, and wherein there is a handle support member having a series of arcuately spaced holes to be engaged selectively by said projecting pin for varying the shutter aperture in accordance with the angular movement of the operating shaft, the said handle support having the said operating handle connected thereto, and wherein said handle support member is provided with a pin constituting a stop for the pin that projects from the shutter setting knob when it reaches the limit of its travel in either direction.

21. A focal plane shutter for a photographic camera consisting of two self-capping curtains in close parallelism, each having an opening, which openings together constitute the exposure aperture, and means for winding said two curtains and for keeping them locked together while being wound, said winding and locking means including a stud 196 mounted upon a part of the camera body and having a bushing, a pinion 195 on said bushing, a second curtain rewind gear 202 mounted on said pinion 195, a ring-like washer member 208 attached to said second curtain rewind gear 202 and provided with a ring-like member 210 having a series of internal notches 211, and also having a bulb release dog 212, a first curtain rewind take-up gear 205 mounted on and free to rotate on the hub of said second curtain rewind gear 202, said two curtains having rewind spools provided with pinions in meshing relation with said two rewind gears 205 and 202 respectively, a bulb release lever to engage said bulb release dog, and an interlock pawl pivoted upon said first curtain rewind gear to engage said second curtain rewind gear and to interlock said two curtain rewind gears.

22. Shutter curtain rewinding means in accordance with claim 21, wherein there are provided a retainer plate 214 for holding in position said first rewind gear 205, and an adjacent first curtain rewind or drive spring 215 of substantially flat plate-like form, said first rewind gear 205 having a drive pin 217 attached to and projecting from a face thereof and adapted to engage said drive spring 215, and wherein there is provided a stationary cam 234 to disengage the said spring 215 from the said drive pin 217 when said pin reaches the limit of its travel in one direction.

23. Shutter curtain rewinding means in accordance with claim 21, said interlock pawl being provided with a dog portion at one end thereof and gear teeth at the opposite end thereof, a rocker arm also pivoted upon said first curtain rewind gear 205 and having teeth meshing with those of the curtain latch or interlock pawl and a shutter release lever adapted to engage and to co-act with the said rocker arm, whereby, when the said rewind gears 202 and 205 are in their wound condition, the dog portion of said latch or interlock pawl is held out of engagement with the said internal notches, and when the shutter release lever is operated, the said dog portion engages one of said notches.

24. Shutter curtain rewinding means in accordance with claim 21, but wherein said interlock pawl is provided with a dog portion at one end thereof and gear teeth at the opposite end thereof, a rocker arm also pivoted upon said first curtain rewind gear and having teeth meshing with those of the curtain latch or interlock pawl, and also having an arm and a spring engaging therewith, said spring being carried by the said first curtain rewind gear, whereby said curtain interlock pawl is moved, and a shutter release lever adapted to engage and to co-act with the said rock arm, whereby, when the said rewind gears are in their wound condition, the dog portion of said latch or interlock pawl is held out of engagement with the said internal notches, and when the shutter release lever is operated, the said dog portion engages one of said notches.

25. Shutter curtain rewinding means in accordance with claim 21, wherein there are provided a retainer plate 214 for holding in position said first curtain rewind gear 205, and a first curtain rewind or drive spring 215 of substantially flat plate-like form, said first curtain rewind gear 205 having a drive pin 217 attached to and projecting from a face thereof and adapted to engage said drive spring 215, and wherein there is provided means to engage the under face of said plate-like spring 215 periodically, thereby to move it outward away from the path of said drive pin 217, and wherein there is provided a shutter release lever 226 having a latch formation 235 to engage said drive pin 217.

26. In bulb-exposure shutter-controlling mechanism an interconnected two-curtain shutter of a photographic camera having shutter rewinding mechanism, shutter release mechanism and shutter aperture setting mechanism to constitute a complete curtain shutter operating mechanism, which curtain shutter is provided with a first curtain rewind gear 205, and with a second curtain rewind gear 202 having a bulb release control dog 212, and as a cooperating sub-combination of said complete curtain shutter operating mechanism a shutter rewind or setting lengthwise movable bar 185, an operating handle 42, operating connections between said operating handle 42 and said shutter rewind or setting bar 185 for operating the latter and operating connections between the latter and the said shutter curtain rewind gears for rewinding the shutter, a bulb stop or release lever 279, and means intermediate of and operatively related to said shutter rewind or setting bar 185 and said bulb stop or release lever 279, whereby on lengthwise movement of said rewind or setting bar 185 said release lever 279 is brought into engagement with said bulb release control dog 212 of the said second curtain rewind gear 202 for the rewinding of said two-curtain shutter.

27. A focal plane shutter for a photographic camera in accordance with claim 13, but wherein there is a shutter rewinding plate 110 carried by said operating shaft, and a cam plate 160 pivoted on said plate 110 on said operating shaft and having a lobe 166, and means for imparting to-and-fro movement to said plate 160 for operating the shutter winding mechanism, and wherein there is a cam 167 to engage said lobe 166 and thereby to move said cam plate, and wherein there is a shaft 168 operatively connected to the said operating shaft and carrying said cam 167 and extending through the said operating shaft.

28. A focal plane shutter in accordance with claim 13, but wherein there is provided a shutter setting knob 41 mounted about and movable axially and circumferentially of said operating shaft and having a pin 175, a handle support member 113 operatively supported upon said operating shaft and having an operating handle attached to said handle support member, the latter having a series of arcuately spaced holes 176 into any one of which the pin 175 may be positioned for varying the angular position of the shutter setting knob, thereby to vary the size of the shutter aperture of said focal plane shutter.

29. A focal plane shutter for a photographic camera consisting of two self-capping curtains in close parallelism and each having an opening, which openings together constitute the exposure aperture, a manually movable shutter release member, means including rewind gears for winding said curtains, and means for varying the size of such exposure aperture, such winding means and exposure aperture varying means including a shaft 102 having a to-and-fro turning movement only, cooperating connections between said shaft 102 and said rewind gears to turn the latter for rewinding the shutter, and also including a handle support member 113 operatively carried by said shaft, an operating to-and-fro movable handle 42 attached to said handle support member and by the forward and return movement of which the said shaft 102 is turned through partial rotations only, in opposite directions, said operating handle constituting one of the supports for holding and supporting the camera for operation, a shutter setting knob 41 upon said shaft 102 but movable axially and circumferentially thereof for the purpose of changing the circumferential relationship of said operating handle and said shaft 102 and for that purpose having a pin 175, the handle support member having a series of circumferentially spaced holes 176, in any one of which the pin 175 may be received and means connected to said knob for varying the relative angular rewinding movement of said rewind gears for the purpose of varying the size of the shutter exposure opening.

30. A focal plane shutter for a photographic camera in accordance with claim 29, but wherein a shutter release lever and interlocking means cooperating with said release lever and said operating handle 42 are provided, the latter thereby cooperating to lock the handle 42 after a swinging back-and-forth movement until the shutter release lever is allowed to return to its normal position after making an exposure, and means connected to the shutter release lever for disengaging the handle locking means when the shutter release lever has returned to its normal position.

31. A focal plane shutter for a photographic camera in accordance with claim 29, but wherein the camera is provided with a shutter rewind plate 110 carried by said shaft 102, a cam plate 160 pivoted on said plate 110 and having a lobe 166, a cam 167 to engage said lobe 166 and thereby to move said cam plate, and a shaft 168 carrying said cam 167 and extending through and operatively connected with said shaft 102, and means for manually circumferentially adjusting the said shaft 168 with its cam 167.

32. A focal plane shutter for a photographic camera in accordance with claim 29, but wherein the camera is provided with a rewind gear 205 for the first curtain, a rewind gear 202 for the second curtain in close parallelism with rewind gear 205, said rewind gear 202 having upon an inner arcuate surface thereof a circumferentially extending series of notches 211, and an interlock pawl pivotally mounted upon the rewind gear 205 and having a holding formation to engage said notches 211 upon movement of said interlock pawl upon its pivot.

33. A focal plane shutter for a photographic camera in accordance with claim 29, but wherein the means for varying the size of the exposure aperture includes interlocking means, and wherein the two shutter curtain rewind gears are co-axially mounted in close parallelism, and wherein there is an interlocking member carried by one of said rewind gears for movement thereon and having engagement with the other rewind gear, when moved, to ensure said rewind gears moving together during exposure.

34. A photographic camera having therein a focal plane shutter comprising a first curtain and a second curtain mounted in close parallelism and each provided with a single aperture together constituting an exposure aperture, the edges of which two apertures may be brought into different spaced relationship with each other to vary the area of the exposure aperture of the shutter, a roll at each end of each curtain, a pinion on each of said rolls, a first curtain rewind gear meshing with the said pinion on the roll of said first curtain, a second curtain rewind gear meshing with the said pinion on a roll of said second curtain, said two rewind gears being in close parallelism, interlocking means mounted on one of said rewind gears and movable in operation, so as to be brought into engagement with the other of said rewind gears to cause said two rewind gears to turn together in winding the shutter, shutter rewinding means co-acting with said two curtain rewind gears and cooperating therewith in effecting rewinding of said shutters, means including a shutter release lever co-acting with said curtains for releasing them to make an exposure, aperture-opening varying means to vary the size of the exposure aperture of the shutter, said shutter rewinding means including an operating rock shaft operatively connected to said focal plane shutter, an elongated handle cooperating therewith for operating said shaft by rocking it to and fro, and also constituting a support for the camera while being operated and for effecting its supporting function extending in close parallelism with an external wall of the camera casing and itself having a to-and-fro rocking movement so as thereby to rock said operating shaft to-and-fro, and by the forward movement of said operating handle effecting the rewinding of the said shutter, and interlocking means co-acting with the said operating handle to lock the said operating handle after a complete forward and ensuing return rocking movement of said operating handle so that the said operating handle is automatically locked at the end of its said return movement and cannot again be operated until an exposure has been made, and means connected to the shutter release lever for disengaging the handle locking means when the shutter release lever has returned to its normal position.

35. A photographic camera having therein a focal plane shutter comprising a first curtain and a second curtain mounted in close parallelism and each provided with a single aperture together constituting an exposure aperture, a roll at each end of each curtain, a pinion on each of said rolls, a first curtain rewind gear meshing with the said pinion on the roll of said first curtain, a second curtain rewind gear meshing with the said pinion on a roll of said second curtain, said two rewind gears being in close parallelism, interlocking means mounted on one of said rewind gears and movable in operation, so as to be brought into engagement with the other of said rewind gears to cause said two rewind gears to turn together in winding the shutter, shutter rewinding means co-acting with said two curtain rewind gears and cooperating therewith in effecting rewinding of said shutter, means for locking the curtains against movement, and a shutter release lever for disengaging said locking means, aperture-opening varying means to vary the size of the exposure aperture of the shutter, said shutter rewinding means including an operating rock shaft, an elongated handle cooperating therewith for operating said shaft by rocking it to-and-fro, and also constituting a support for the camera while being operated and for effecting its supporting function extending in close parallelism with an external wall of the camera casing and itself having a to-and-fro rocking movement so as thereby to rock said operating shaft to-and-fro, and by the forward movement of said operating handle effecting the rewinding of the said shutter, and interlocking means co-acting with the said operating handle to lock the said operating handle after a complete forward and ensuing return rocking movement of said operating handle so that the said operating handle is automatically locked at the end of its said return movement and cannot again be operated until an exposure has been made, and means connected to the shutter release lever for disengaging the handle locking means when the shutter release lever has returned to its normal position.

36. A photographic camera having therein a focal plane shutter comprising a first curtain and a second curtain mounted in close parallelism and each provided with a single aperture together constituting an exposure aperture, a roll at each end of each curtain, a pinion on each of said rolls, a first curtain rewind gear meshing with the said pinion on the roll of said first curtain, a second curtain rewind gear meshing with the said pinion on a roll of said second curtain, said two rewind gears being in close parallelism, shutter rewinding means co-acting with said two curtain rewind gears and cooperating therewith in effecting rewinding of said shutter, means for locking the curtains against movement, and a shutter release lever for disengaging said locking means, aperture-opening varying means to vary the size of the exposure aperture of the shutter, said shutter rewinding means including an operating rock shaft to which said aperture-opening varying means is connected, an elongated handle cooperating with said rock shaft for operating said shaft by rocking it to-and-fro, and also constituting a support for the camera while being operated and for effecting its supporting function extending in close parallelism with an external wall of the camera casing and itself having a to-and-fro rocking movement so as thereby to rock said operating shaft to-and-fro, and by the forward movement of said operating handle effecting the rewinding of the said shutter, a movable member for locking the handle against movement, means constantly urging said locking member into locking position, a movable member connected to the said shutter release member to be moved thereby upon movement of said shutter release member, and operative after the shutter release member has been moved through a predetermined distance to engage and move said locking member from locking position.

37. A photographic camera having therein a focal plane shutter comprising a first curtain and a second curtain mounted in close parallelism and each provided with a single aperture together constituting an exposure aperture, the edges of which two apertures may be brought into different spaced relationship with each other to vary the area of the exposure aperture of the shutter, a roll at each end of each curtain, a pinion on each of said rolls, a first curtain rewind gear meshing with the said pinion on the roll of said first curtain, a second curtain rewind gear meshing with the said pinion on a roll of said second curtain, said two rewind gears being in close parallelism, shutter rewinding means co-acting with said two curtain rewind gears and cooperating therewith in effecting rewinding of said shutter, means for locking the curtains against movement, and a shutter release lever for disengaging said locking means, aperture-opening varying means to vary the size of the exposure aperture of the shutter, said shutter rewinding means including an operating rock shaft, to which said aperture-opening varying means is connected, an elongated handle cooperating with said rock shaft for operating said shaft by rocking it to and fro, and also constituting a support for the camera while being operated and for effecting its supporting function extending in close parallelism with an external wall of the camera casing and itself having a to-and-fro rocking movement so as thereby to rock said operating shaft to-and-fro, and by the forward movement of said operating handle effecting the rewinding of the said shutter, a movable member for locking the handle against movement, means constantly urging said locking member into locking position, a movable member connected to the said shutter release member to be moved thereby upon movement of said shutter release member, and operative after the shutter release member has been moved through a predetermined distance to engage and move said locking member from locking position.

38. A photographic camera in accordance with claim 37, wherein the said elongated handle is mounted co-axially with respect to said operating rock shaft, and wherein exposure opening area adjusting means are provided consisting of means to vary circumferentially the relationship of the said operating shaft and said elongated handle so as thereby to vary the area of the exposure opening of the shutter.

EDSON S. HINELINE.

REFERENCES CITED

The following references are of record in the file of this patent:

UNITED STATES PATENTS

| Number | Name | Date |
|---|---|---|
| 1,077,157 | Pickard | Oct. 28, 1913 |
| 1,645,923 | Ohlan | Oct. 18, 1927 |
| 1,666,852 | Grosse | Apr. 17, 1928 |
| 2,019,672 | Goodhand | Nov. 5, 1935 |
| 2,047,478 | Lloyd et al. | July 14, 1936 |
| 2,101,652 | Robles | Dec. 7, 1937 |
| 2,135,963 | Crumrine | Nov. 8, 1938 |
| 2,150,693 | Mihalyi | Mar. 14, 1939 |
| 2,242,124 | Hineline | May 13, 1941 |
| 2,257,012 | Hineline | Sept. 23, 1941 |
| 2,357,328 | Harris | Sept. 5, 1944 |
| 2,362,815 | Gorey et al. | Nov. 14, 1944 |
| 2,371,593 | Gorey et al. | Mar. 13, 1945 |
| 2,381,033 | Bolsey | Aug. 7, 1945 |
| 2,386,538 | Bolsey | Oct. 9, 1945 |
| 2,392,071 | Terrett et al. | Jan. 1, 1946 |
| 2,406,366 | Graef | Aug. 27, 1946 |
| 2,435,835 | Hineline | Feb. 10, 1948 |